US012658011B2

(12) United States Patent
Chen

(10) Patent No.: US 12,658,011 B2
(45) Date of Patent: Jun. 16, 2026

(54) HAPTIC FEEDBACK SIGNAL DETECTION CIRCUIT, DRIVING CONTROL CIRCUIT, AND HAPTIC FEEDBACK APPARATUS

(71) Applicant: BOE Technology Group Co., Ltd., Beijing (CN)

(72) Inventor: Zhihui Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 32 days.

(21) Appl. No.: 18/729,160

(22) PCT Filed: Dec. 16, 2022

(86) PCT No.: PCT/CN2022/139702
§ 371 (c)(1),
(2) Date: Jul. 19, 2024

(87) PCT Pub. No.: WO2024/124555
PCT Pub. Date: Jun. 20, 2024

(65) Prior Publication Data
US 2025/0118176 A1 Apr. 10, 2025

(51) Int. Cl.
*G08B 6/00* (2006.01)

(52) U.S. Cl.
CPC .................................... *G08B 6/00* (2013.01)

(58) Field of Classification Search
CPC ........ G08B 6/00; H10N 30/802; G06F 3/016; G01L 1/16
See application file for complete search history.

(56) References Cited

U.S. PATENT DOCUMENTS 7,428,990 B1 * 9/2008 Milford .................. G06K 7/081
235/440
2006/0028095 A1 * 2/2006 Maruyama ............. H10N 30/50
310/316.01

(Continued)

FOREIGN PATENT DOCUMENTS

CN 105703729 A 6/2016
CN 108287032 A 7/2018

(Continued)

OTHER PUBLICATIONS

Extended European Search Report and Search Opinion received for European Application No. 22968259.6, mailed on Mar. 6, 2025, 7 pages.

*Primary Examiner* — Brent D Castiaux
(74) *Attorney, Agent, or Firm* — ArentFox Schiff LLP; Michael Fainberg

(57) ABSTRACT

A haptic feedback signal detection circuit (211-*m*), a driving control circuit (200), and a haptic feedback apparatus. The haptic feedback signal detection circuit (211-*m*) includes: a charge-voltage conversion circuit (2111-*m*) coupled to at least one haptic detection piezoelectric device (021-*m*) in a haptic feedback panel (100), wherein the charge-voltage conversion circuit (2111-*m*) is configured to convert, when a target object is pressed, a charge signal of each of the at least one haptic detection piezoelectric device (021-*m*) into an initial voltage signal and then output the initial voltage signal; and at least one voltage amplifier circuit (2112-*m*), wherein the at least one voltage amplifier circuit (2112-*m*) is configured to sequentially amplify the initial voltage signals into target voltage signals and then output the target voltage signals to a detection output end as haptic feedback signals.

19 Claims, 15 Drawing Sheets

(56) References Cited

U.S. PATENT DOCUMENTS

| | | | | |
|---|---|---|---|---|
| 2016/0306481 | A1* | 10/2016 | Filiz | G01L 1/144 |
| 2018/0074101 | A1* | 3/2018 | Wu | G01R 27/2605 |

FOREIGN PATENT DOCUMENTS

| | | | |
|---|---|---|---|
| CN | 109100070 | A | 12/2018 |
| CN | 110419165 | A | 11/2019 |
| CN | 110928405 | A | 3/2020 |
| CN | 113616163 | A | 11/2021 |
| CN | 114305729 | A | 4/2022 |
| JP | 2006-107140 | A | 4/2006 |

* cited by examiner

HAPTIC FEEDBACK SIGNAL DETECTION CIRCUIT, DRIVING CONTROL CIRCUIT, AND HAPTIC FEEDBACK APPARATUS

CROSS REFERENCE TO RELATED APPLICATIONS

The present disclosure is a national phase entry under 35 U.S.C § 371 of International Application No. PCT/CN2022/139702, filed Dec. 16, 2022, and the entire content of which is incorporated herein by reference.

TECHNICAL FIELD

The present disclosure relates to the field of haptic interaction technology, in particular to a haptic feedback signal detection circuit, a driving control circuit and a haptic feedback apparatus.

BACKGROUND

Haptics is the focus of today's technological development, specifically, haptic feedback can interact with the human body through the sense of touch. Haptic feedback can be divided into two categories, one is vibration feedback and the other is haptic reproduction technology.

Surface haptic reproduction technology can perceive the characteristics of objects by touching the screen with bare fingers, and realize efficient and natural interaction in multimedia terminals, which has great research value, and thus has been widely concerned by domestic and foreign researchers. Surface haptic is physically the effect between the surface roughness of the object and the surface of the skin (fingertips), and the friction force is formed due to the different surface structures. Therefore, by controlling the friction of the surface, it is possible to simulate different haptic sensations/tactile impressions.

SUMMARY

Embodiments of the present disclosure provide a haptic feedback signal detection circuit, including:

a charge-voltage conversion, circuit coupled with at least one haptic detection piezoelectric device in a haptic feedback panel; where the charge-voltage conversion circuit is configured to convert a charge signal of each haptic detection piezoelectric device in the at least one haptic detection piezoelectric device to an initial voltage signal when pressed by a target object, and output the initial voltage signal;

at least one voltage amplification circuit, where the at least one voltage amplification circuit is configured to sequentially amplify the initial voltage signal to a target voltage signal and output the target voltage signal to a detection output terminal as a haptic feedback signal.

In some possible embodiments, the charge-voltage conversion circuit includes: a charge-voltage conversion sub-circuit, a phase compensation sub-circuit and a matching sub-circuit;

the charge-voltage conversion sub-circuit is configured to convert the charge signal of each haptic detection piezoelectric device in the at least one haptic detection piezoelectric device to the initial voltage signal, and output the initial voltage signal;

the phase compensation sub-circuit is coupled between the charge-voltage conversion sub-circuit and at least one haptic detection piezoelectric device, and is configured to carry out a phase compensation; and the matching sub-circuit is coupled with the charge-voltage conversion sub-circuit and is configured to carry out a matching balancing.

In some possible embodiments, the charge-voltage conversion sub-circuit includes: a first amplifier and a first capacitor;

a first input terminal of the first amplifier is coupled with the phase compensation sub-circuit and a first terminal plate of the first capacitance, a second input terminal of the first amplifier is coupled with the matching sub-circuit, and an output terminal of the first amplifier is coupled with a second terminal plate of the first capacitor and the at least one voltage amplification circuit.

In some possible embodiments, the charge-voltage conversion sub-circuit further includes: a first resistor;

a first terminal of the first resistor is coupled with the first input terminal of the first amplifier, and a second terminal of the first resistor is coupled with the output terminal of the first amplifier.

In some possible embodiments, the first resistor is a resistor of a fixed resistance value, or the first resistor is a resistor of a variable resistance value.

In some possible embodiments, the first amplifier includes a JFET-type amplifier.

In some possible embodiments, the phase compensation sub-circuit includes: a second resistor and a second capacitance;

a first terminal of the second resistor is coupled with the at least one haptic detection piezoelectric device, a second terminal of the second resistor is coupled with a first terminal plate of the second capacitance, and a second terminal plate of the second capacitor is coupled with the charge-voltage conversion sub-circuit.

In some possible embodiments, the matching sub-circuit includes: a third resistor and a third capacitor;

a first terminal of the third resistor is coupled with the charge-voltage conversion sub-circuit, and a second terminal of the third resistor is coupled with a ground terminal;

a first terminal plate of the third capacitor is coupled with the charge-voltage conversion sub-circuit, and a second terminal plate of the third capacitor is coupled with the ground terminal.

In some possible embodiments, the matching sub-circuit further includes: a fourth resistor;

a first terminal of the fourth resistor is coupled with a reference-voltage terminal, and a second terminal of the fourth resistor is coupled with the second input terminal of the first amplifier.

In some possible embodiments, the haptic feedback signal detection circuit includes a voltage amplification circuit;

the voltage amplification circuit includes: a second amplifier, a fifth resistor, a sixth resistor and a fourth capacitor;

a first input terminal of the second amplifier is coupled with the charge-voltage conversion circuit, a second input terminal of the second amplifier is coupled with a first terminal of the fifth resistor and a first terminal of the sixth resistor, and an output terminal of the second amplifier is coupled with a second terminal of the sixth resistor and the detection output terminal;

a second terminal of the fifth resistor is coupled with a first terminal plate of the fourth capacitor; and a second terminal plate of the fourth capacitor is coupled with the ground terminal.

In some possible embodiments, the voltage amplification circuit further includes a protection resistor; an output terminal of the second amplifier is coupled with the detection output terminal through the protection resistor.

Embodiments of the present disclosure further provide a driving control circuit including:

a feedback detection circuit including: an analog-to-digital conversion circuit and at least one haptic feedback signal detection circuit described above; where the analog-to-digital conversion circuit is coupled with the at least one haptic feedback signal detection circuit, and the analog-to-digital conversion circuit is configured to carry out an analog-to-digital conversion to convert a haptic feedback signal output by each haptic feedback signal detection circuit in the at least one haptic feedback signal detection circuit to a detection signal and output the detection signal;

a data processing circuit coupled with the feedback detection circuit, and the data processing circuit is configured to receive the detection signal corresponding to each haptic feedback signal detection circuit, and output a driving enabling signal according to the detection signal corresponding to each haptic feedback signal detection circuit and a preset threshold;

a feedback drive circuit respectively coupled with at least one haptic driving piezoelectric device in the haptic feedback panel and the data processing circuit, and the feedback drive circuit is configured to receive the driving enabling signal and output a driving control signal to at least one haptic driving piezoelectric device according to the driving enabling signal.

In some possible embodiments, the feedback drive circuit includes: at least one reference-voltage generation circuit, at least one driving generation circuit and at least one signal output circuit; the at least one reference-voltage generation circuit, the at least one driving generation circuit, the at least one signal output circuit and the at least one haptic driving piezoelectric device are in one-to-one correspondence;

the at least one reference-voltage generation circuit is configured to generate a reference voltage;

the at least one driving generation circuit is coupled with the data processing circuit, and the at least one driving generation circuit is configured to receive the driving enabling signal and the reference voltage, generate an initial control signal according to the driving enabling signal and the reference voltage, and output the initial control signal;

the at least one signal output circuit is coupled with at least one the driving generation circuit, and the at least one signal output circuit is configured to receive the initial control signal, step up the initial control signal to generate the driving control signal, and output the driving control signal to the at least one haptic driving piezoelectric device that is correspondingly coupled.

In some possible embodiments, the driving generation circuit includes: a digital-to-analog conversion circuit, a third amplifier and a fifth capacitor;

a signal input terminal of the digital-to-analog conversion circuit is coupled with the data processing circuit, a reference-voltage input terminal of the digital-to-analog conversion circuit is coupled with the reference-voltage generation circuit, an output terminal of the digital-to-analog conversion circuit is coupled with a positive phase input terminal of the third amplifier, a comparison voltage terminal of the digital-to-analog conversion circuit is coupled with a negative phase input terminal of the third amplifier, and a reference signal terminal of the digital-to-analog conversion circuit is coupled with an output terminal of the third amplifier;

the output terminal of the third amplifier is coupled with the at least signal output circuit; and a first terminal of the fifth capacitor is coupled with the negative phase input terminal of the third amplifier, and a second terminal of the fifth capacitor is coupled with the output terminal of the third amplifier.

In some possible embodiments, the signal output circuit includes a high-voltage operational amplifier;

a first input terminal of the high-voltage operational amplifier is coupled with the driving generation circuit, a second input terminal of the high-voltage operational amplifier is coupled with the ground terminal, and an output terminal of the high-voltage operational amplifier is coupled with a corresponding haptic driving piezoelectric device;

where the first input terminal of the high-voltage operational amplifier is a positive phase input terminal, and the second input terminal of the high-voltage operational amplifier is a negative phase input terminal; or, the first input terminal of the high-voltage operational amplifier is a negative phase input terminal, and the second input terminal of the high-voltage operational amplifier is a positive phase input terminal.

In some possible embodiments, the signal output circuit further includes: a seventh resistor;

a first terminal of the seventh resistor is coupled with the negative phase input terminal of the high-voltage operational amplifier, and a second terminal of the seventh resistor is coupled with the output terminal of the high-voltage operational amplifier.

In some possible embodiments, the signal output circuit further includes: at least one of an eighth resistor, a ninth resistor or a tenth resistor;

a first terminal of the eighth resistor is coupled with the ground terminal, and a second terminal of the eighth resistor is coupled with the second input terminal of the high-voltage operational amplifier;

a first terminal of the ninth resistor is coupled with the output terminal of the high-voltage operational amplifier, and a second terminal of the ninth resistor is coupled with the corresponding haptic driving piezoelectric device; and a first terminal of the tenth resistor is coupled with the driving generation circuit, and a second terminal of the tenth resistor is coupled with the first input terminal of the high-voltage operational amplifier.

In some possible embodiments, the data processing circuit is further configured to determine the detection comparison value according to the detection signal corresponding to each haptic feedback signal detection circuit and a weight corresponding to each haptic detection piezoelectric device, and output the driving enabling signal in response to the detection comparison value not being less than the preset threshold.

In some possible embodiments, the detection comparison value is determined by following formula:

$$FS = a_1 * f_1 + a_2 * f_2 + a_3 * f_3 + \ldots\ldots\ a_{M-1} * F_{M-1} + a_M * F_M;$$

herein, FS represents the detection comparison value, $a_m$ represents a weight corresponding to a m-th haptic detection piezoelectric device, $f_m$ represents the detection signal corresponding to a haptic feedback signal detection circuit coupled with the m-th haptic detection piezoelectric device, 1≤m≤M, and M and m are integers, and M represents a total quantity of haptic detection piezoelectric devices in the haptic feedback panel.

In some possible embodiments, the data processing circuit is further configured to obtain coordinates of a position pressed by a target object, determine a pressing distance between each haptic detection piezoelectric device in the at least one haptic detection piezoelectric device coupled with each haptic feedback signal detection circuit, and determine the weight corresponding to each haptic detection piezoelectric device in the at least one haptic detection piezoelectric device coupled with each haptic feedback signal detection circuit according to the pressing distance of each haptic detection piezoelectric device in the at least one haptic detection piezoelectric device coupled with each haptic feedback signal detection circuit.

In some possible embodiments, the driving control circuit further includes a touch drive circuit; the touch drive circuit is coupled with a plurality of touch electrodes in the haptic feedback panel, and the touch drive circuit is configured to obtain touch voltage signals on the touch electrodes when pressed by the target object, and determine the coordinates of the position pressed by the target object according to obtained touch voltage signals; and the data processing circuit is further configured to obtain the coordinates of the position pressed by the target object from the touch drive circuit.

Embodiments of the present disclosure further provide a haptic feedback apparatus including: a haptic feedback panel and aforementioned driving control circuit.

DETAILED DESCRIPTION

Figure 1:
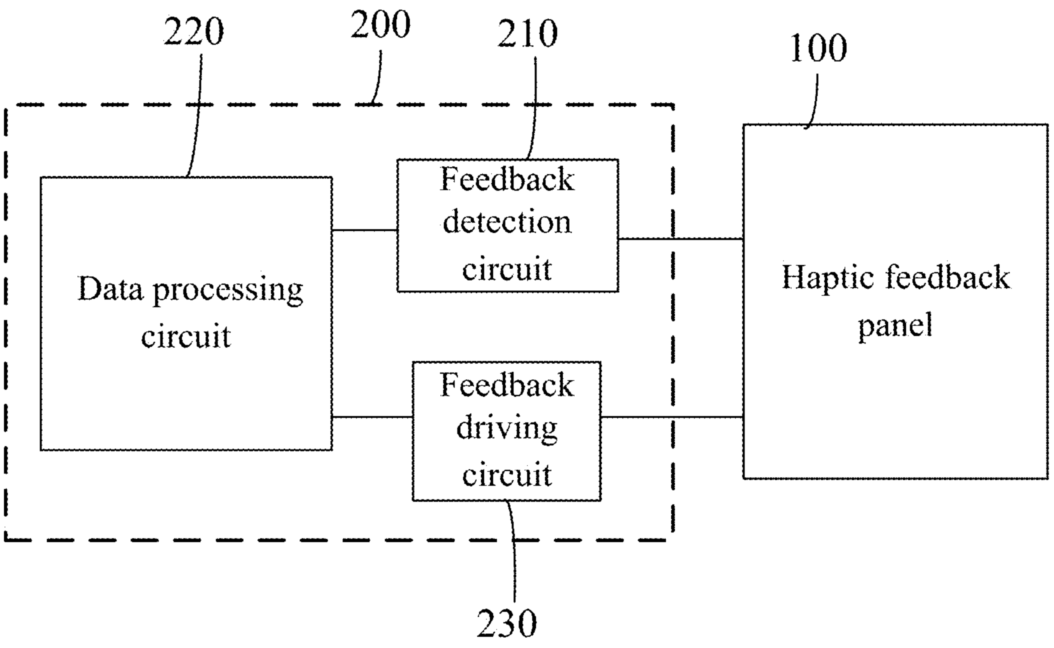
FIG. 1 is a schematic diagram of a structure of a haptic feedback apparatus provided by an embodiment of the present disclosure.

In order to make the purposes, technical solutions and advantages of the embodiments of the present disclosure clearer, the technical solutions of the embodiments of the present disclosure will be clearly and completely described below in conjunction with the drawings of the embodiments of the present disclosure. Obviously, the embodiments described are some embodiments of the present disclosure, not all embodiments. And in the absence of conflict, the embodiments in the present disclosure and the features in the embodiments may be combined with each other. Based on the embodiments of the present disclosure described, all other embodiments obtained by a person skilled in the art without creative labor are within the scope of protection of the present disclosure.

Unless otherwise defined, the technical or scientific terms used in this disclosure shall have the ordinary meaning understood by persons with general skill in the field to which this disclosure belongs. The terms "first", "second" and similar expressions used in this disclosure do not indicate any order, number or importance, but only to distinguish the different components. Words such as "include" or "comprise" mean that the element or object preceding the word includes the element or object listed after the word and its equivalents, and does not exclude other elements or objects. Similar terms such as "connect" or "connected" are not limited to physical or mechanical connections, but may include electrical connections, whether direct or indirect.

It should be noted that the dimensions and shapes of the figures in the drawings do not reflect the true proportions, and are only intended to illustrate the contents of this disclosure. Moreover, the same or similar designation at all times indicates the same or similar element or component with the same or similar function.

For vibration-based haptic reproduction devices, the operating principle is usually to achieve touch functions such as virtual buttons by attaching piezoelectric sheets, linear motors, or piezoelectric films to the base substrate and applying pulse excitation. The scheme adopting the linear motors may greatly occupy the internal space of an electronic product, resulting in the reduction of the volume of the battery, since the volume of the linear motors is large, thereby shortening the runtime of the product. The scheme adopting piezoelectric sheets requires the introduction of voltage amplification devices, which on the one hand occupying the battery space, and on the other hand, high voltage will also generate a potential risk of electric shock. The scheme adopting piezoelectric film may greatly reduce the thickness of the device, increase the battery space, and prolong the comprehensive runtime of the product since the thickness of the piezoelectric film is usually less than 10 μm. In addition, the use of piezoelectric film does not require high voltage, which ensures the voltage safety of the product.

The embodiments of the present disclosure provide a haptic feedback apparatus, as shown in FIG. 1, including: a haptic feedback panel 100 and a driving control circuit 200. The driving control circuit 200 is configured to drive the haptic feedback panel 100 to work. For example, the haptic feedback apparatus provided in the embodiments of the present disclosure can be applied to medical, automotive electronics, motion tracking systems, and other fields. It is especially suitable for the field of wearable devices, medical monitoring and treatment in vitro or implanted in the human body, or applied to electronic skin in the field of artificial intelligence. Specifically, the haptic feedback apparatus can be applied to brake pads, keyboards, mobile terminals, game controllers, vehicles, smart homes and other haptic feedback apparatuses that can produce vibration and mechanical properties.

Figure 2A:
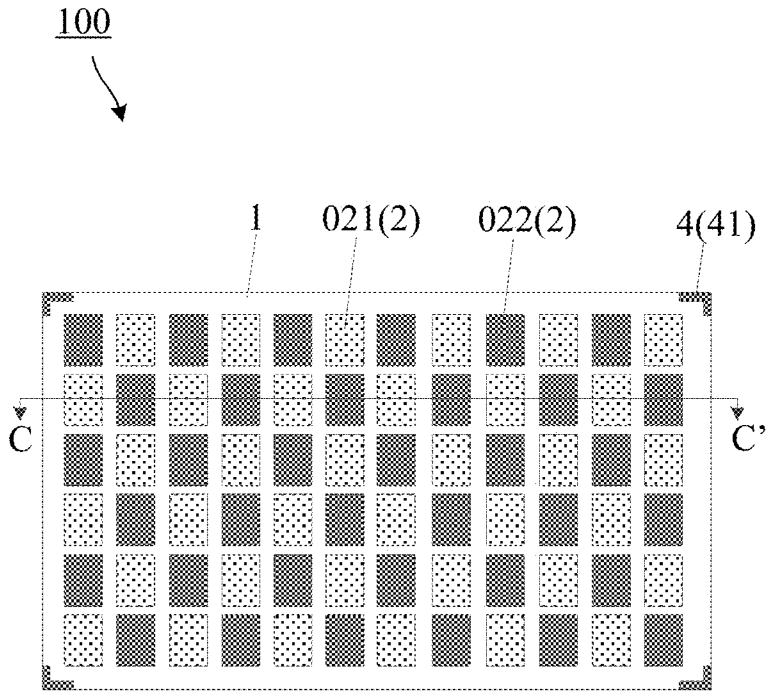
FIG. 2A is a structural schematic diagram of some structures of a haptic feedback panel provided by an embodiment of the present disclosure.
Figure 2B:
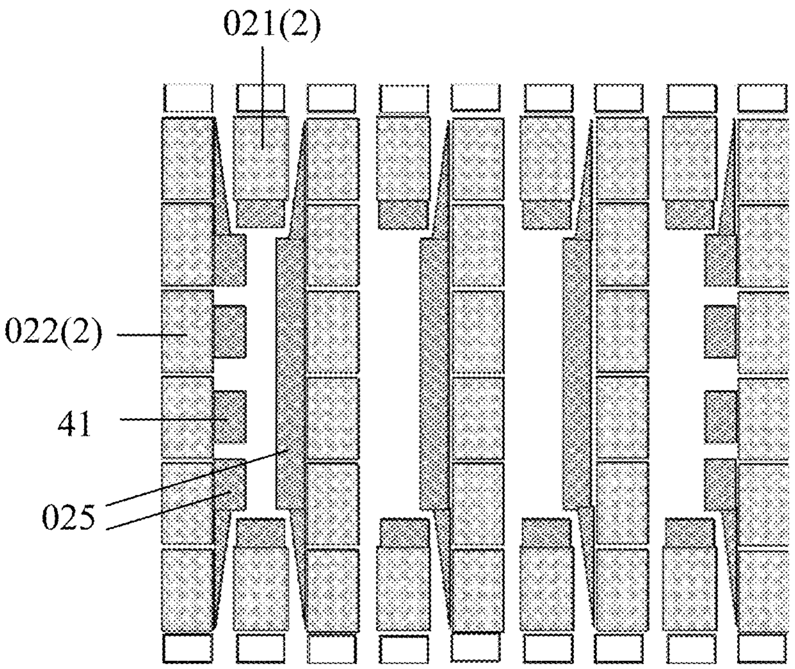
FIG. 2B is another schematic diagram of some structures of the haptic feedback panel provided by an embodiment of the present disclosure.
Figure 2C:
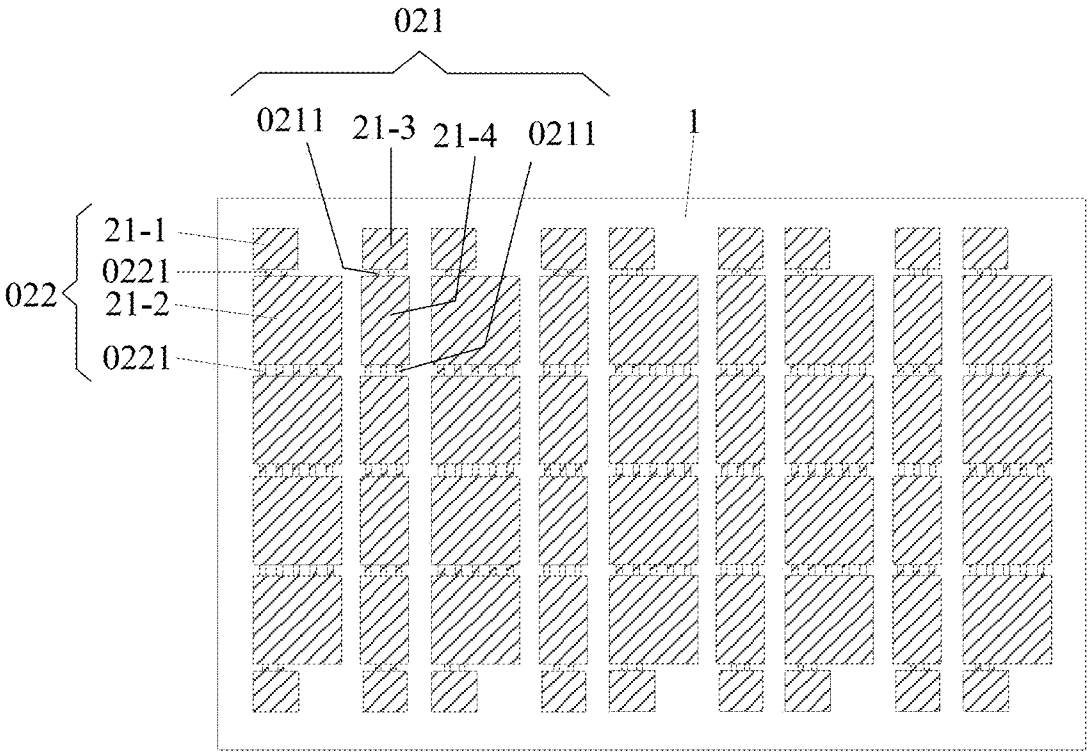
FIG. 2C is another schematic diagram of some structures of the haptic feedback panel provided by an embodiment of the present disclosure.
Figure 2D:
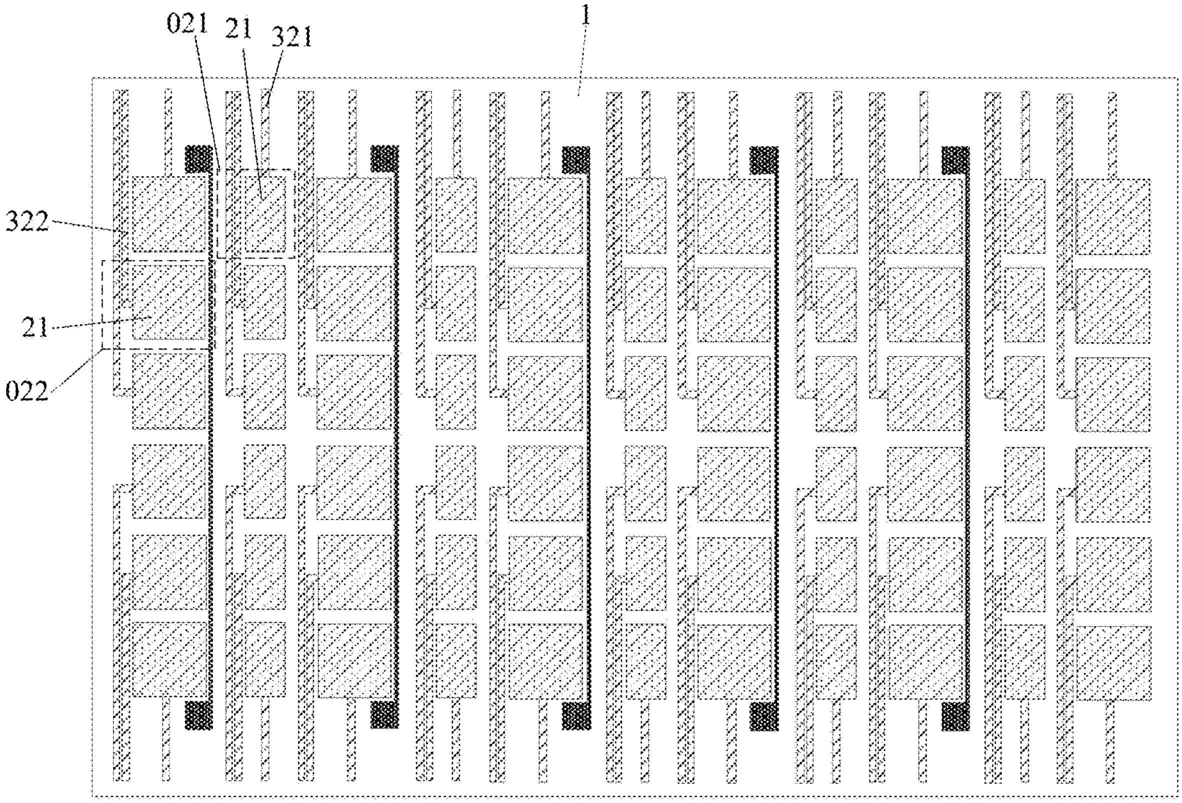
FIG. 2D is another schematic diagram of some structures of the haptic feedback panel provided by an embodiment of the present disclosure.
Figure 2E:
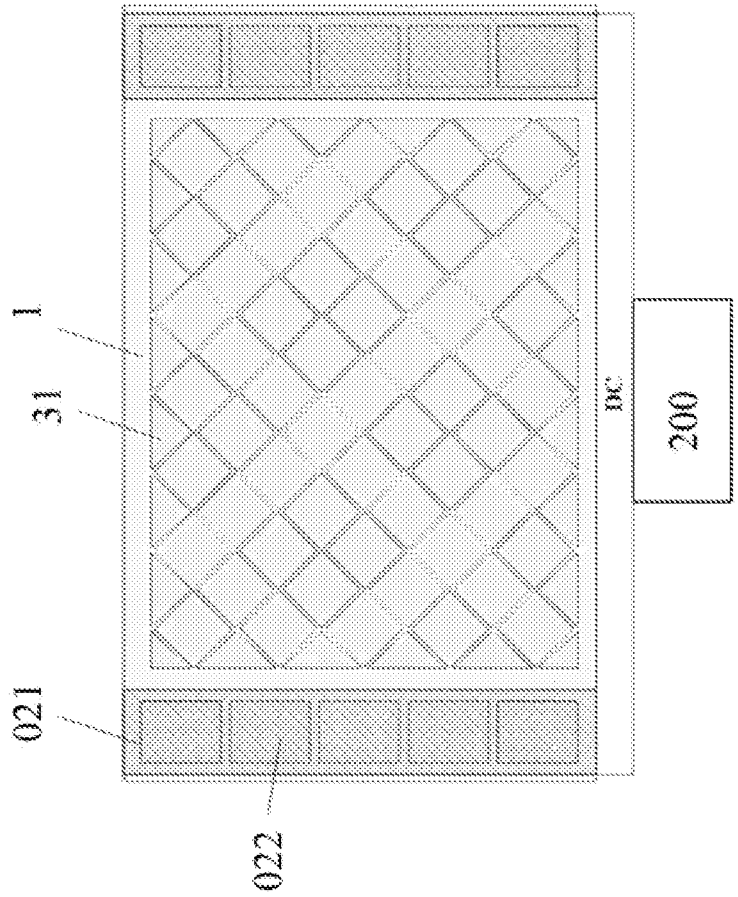
FIG. 2E is another schematic diagram of some structures of the haptic feedback panel provided by an embodiment of the present disclosure.
Figure 3:
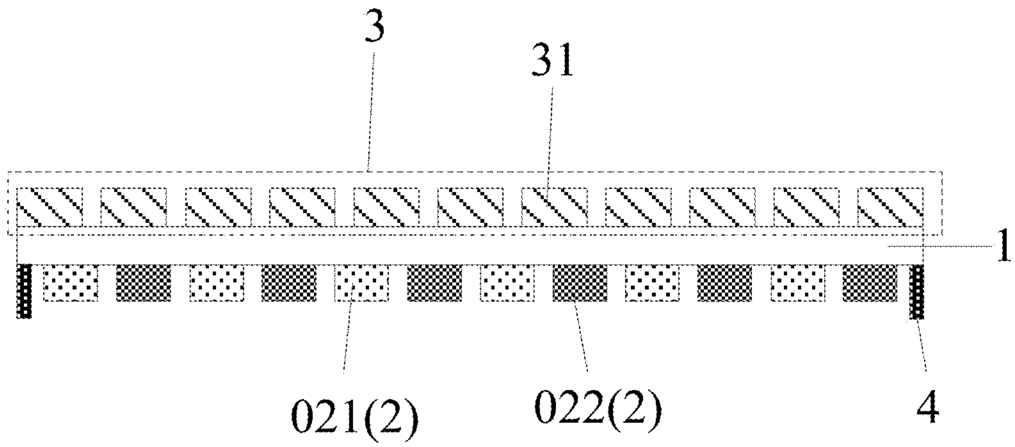
FIG. 3 is a schematic diagram of a cross-sectional structure of the haptic feedback panel shown in FIG. 2A along the CC' direction.

In some embodiments of the present disclosure, as shown in FIG. 2A to FIG. 3, the haptic feedback panel 100 includes: a base substrate 1, a plurality of piezoelectric devices 2 arranged in an array on a side of the base substrate 1, a touch layer 3 located on a side of the base substrate 1 facing away from the piezoelectric device 2. The piezoelectric devices 2 are configured to vibrate under the drive of a voltage signal to drive the base substrate 1 to vibrate. The haptic feedback panel 100 provided in the embodiments of the present disclosure can realize a touch function (such as judging a touch position) and a haptic reproduction function by adopting a structure integrated with the base substrate 1 and the touch layer 3.

In some embodiments of the present disclosure, as shown in FIG. 2A to FIG. 3, the touch layer 3 is attached to the surface of the base substrate 1 and provides information such as the touch position to the system during the touch process. For example, the touch layer 3 is divided into multiple touch electrodes 31 arranged at intervals from each other. For example, the touch electrodes 31 can be self-capacitive touch electrodes, so that the touch function can be realized by adopting self-capacitance technology to determine the position coordinates of the touch position. The touch electrodes 31 can also be mutual-capacitive touch electrodes, so that the mutual-capacitance technology can be used to realize the touch function to determine the position coordinates of the touch position.

In some embodiments of the present disclosure, as shown in FIG. 2A, the piezoelectric device 2 can be a piezoelectric film, and a given voltage signal can directly provide vibration excitation, so that the haptic feedback panel 100 produces a haptic feedback effect. For example, the piezoelectric film is a transparent piezoelectric film.

In some embodiments of the present disclosure, as shown in FIG. 2A to FIG. 3, the base substrate 1 is a substrate that is in direct contact with haptic sense organs such as fingers, and may be a notebook touch pad, a display screen, etc. Specifically, the base substrate 1 may be a substrate made of glass, a substrate made of silicon or silicon dioxide ($SiO_2$), a substrate made of sapphire, and a substrate made of a metal wafer, which is not limited here, and those skilled in the art can set up the base substrate according to the needs of the actual application.

Figure 4:
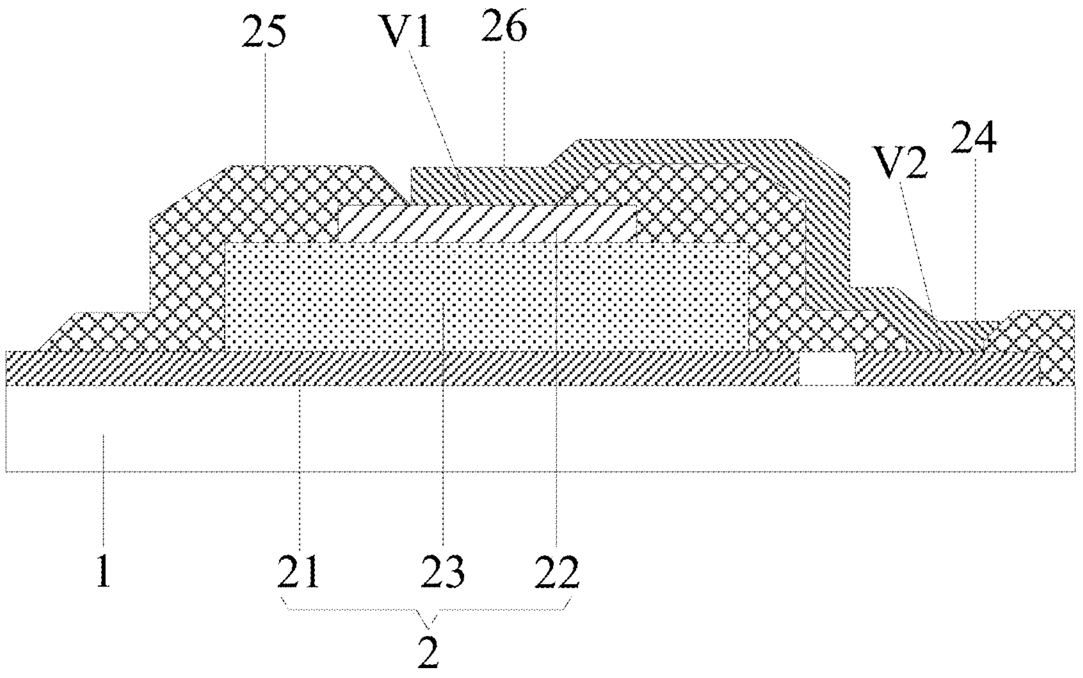
FIG. 4 is a schematic diagram of a cross-sectional structure of a piezoelectric device provided by an embodiment of the present disclosure.

In some embodiments of the present disclosure, as shown in FIG. 4, FIG. 4 is a schematic diagram of the cross-sectional structure of a piezoelectric device 2, which includes: a bottom electrode 21 and a top electrode 22 arranged oppositely, a piezoelectric layer 23 located between the bottom electrode 21 and the top electrode 22, an insulating layer 25 located at a side of the top electrode 22 facing away from the piezoelectric layer 23, and a wiring layer 26 located at a side of the insulating layer 25 facing away from the piezoelectric layer 23. The piezoelectric device 2 may further include: a bonding electrode 24 arranged on the same layer as the bottom electrode 21. The bonding electrode 24 is arranged close to the edge of the base substrate 1. The insulating layer 25 has a first through hole V1 corresponding to the top electrode 22. One end of the wiring layer 26 is electrically connected with the top electrode 22 through the first through hole V1, and the other end of the wiring layer 26 is electrically connected with the bonding electrode 24 through a second through hole V2 penetrating the insulating layer 25.

In some embodiments of the present disclosure, as shown in FIG. 2A to FIG. 3, the plurality of piezoelectric devices 2 is divided into at least one haptic detection piezoelectric device and at least one haptic driving piezoelectric device. That is, a part of the piezoelectric device 2 can be set to the haptic detection piezoelectric device, and the rest can be set to the haptic driving piezoelectric device. For example, one haptic detection piezoelectric device and one haptic driving piezoelectric device can be set up separately. Alternatively, a plurality of haptic detection piezoelectric devices and a plurality of haptic driving piezoelectric devices may be arranged separately (i.e., at least two, or more), and the plurality of haptic detection piezoelectric devices 021 and the plurality of haptic driving piezoelectric devices 022 are uniformly dispersed on the base substrate 1.

Optionally, as shown in FIG. 2A, the plurality of haptic detection piezoelectric devices 021 and the plurality of haptic driving piezoelectric devices 022 may be arranged on the base substrate 1 in a checkerboard arrangement.

Optionally, as shown in FIG. 2B, the plurality of haptic detection piezoelectric devices 021 may be divided into multiple columns, and the plurality of haptic driving piezoelectric devices 022 may also be divided into multiple columns, and a column of haptic detection piezoelectric devices 021 and a column of haptic driving piezoelectric devices 022 are alternately arranged. The bottom electrodes 21 of the haptic detection piezoelectric devices 021 in a column of haptic detection piezoelectric devices 021 are arranged at intervals with each other, and the bottom electrodes 21 of the haptic driving piezoelectric devices 022 in a column of haptic driving piezoelectric devices 022 are also arranged at intervals with each other. For example, the quantity of haptic detection piezoelectric devices 021 in a column of haptic detection piezoelectric devices 021 is less than the quantity of haptic driving piezoelectric devices 022 in a column of haptic driving piezoelectric devices 022. Further, the haptic detection piezoelectric devices and the haptic driving piezoelectric devices further include: a lead electrode 025 arranged on the same layer as the bottom electrode 21. The lead electrode 025 is electrically connected with the bottom electrode 21, and the lead electrode 025 is used for grounding. In addition, a lead electrode through hole 41 is formed at the position where the lead electrode 025 is located, so that the external lead wire and the lead electrode 025 are connected by silver glue and the like.

Optionally, as shown in FIG. 2C, the plurality of haptic detection piezoelectric devices 021 may be divided into multiple columns, and the plurality of haptic driving piezoelectric devices 022 may also be divided into multiple columns, and a column of haptic detection piezoelectric devices 021 and a column of haptic driving piezoelectric devices 022 are arranged alternately. In addition, the haptic detection piezoelectric devices 021 and the haptic driving piezoelectric devices 022 are arranged in an array. The bottom electrodes 21 of the haptic detection piezoelectric devices 021 in a column of haptic detection piezoelectric devices 021 are electrically connected with each other, and the bottom electrodes 21 of the haptic driving piezoelectric devices 022 in a column of haptic driving piezoelectric devices 022 are electrically connected with each other. For example, in a column of haptic detection piezoelectric devices 021, the bottom electrode 21-1 of the haptic detection piezoelectric device 021 is electrically connected with the bottom electrode 21-2 through the first connecting portion 0221, and the bottom electrodes 21-2 are electrically connected with each other through the first connecting portions 0221. In addition, in a column of haptic driving piezoelectric devices 022, the bottom electrode 21-3 of the haptic driving piezoelectric device 022 is electrically connected with the bottom electrode 21-4 through a second connecting portion 0211, and the bottom electrodes 21-4 are electrically connected with each other through the second connecting portions 0211.

Optionally, as shown in FIG. 2D, the plurality of haptic detection piezoelectric devices 021 may be divided into multiple columns, the plurality of haptic driving piezoelectric devices 022 may also be divided into multiple columns, and a column of haptic detection piezoelectric devices 021 and a column of haptic driving piezoelectric devices 022 are arranged alternately. In addition, the haptic detection piezoelectric devices 021 and the haptic driving piezoelectric devices 022 are arranged in an array. The bottom electrodes 21 of the haptic detection piezoelectric devices 021 in a column of haptic detection piezoelectric devices 021 are arranged at intervals with each other, and the bottom electrodes 21 of the haptic driving piezoelectric devices 022 in a column of haptic driving piezoelectric devices 022 are arranged at intervals with each other. Moreover, each haptic detection piezoelectric device 021 is connected with a corresponding haptic detection signal line 322 respectively to transmit a signal through the haptic detection signal line 322. Each haptic driving piezoelectric device 022 is connected with a corresponding haptic driving signal line 321 respectively to transmit a signal through the haptic driving signal line 321.

Optionally, as shown in FIG. 2E, the plurality of haptic detection piezoelectric devices 021 and the plurality of haptic driving piezoelectric devices 022 may also be arranged in the non-display area of the display panel. Moreover, the haptic detection piezoelectric devices 021 and the haptic driving piezoelectric devices 022 are arranged alternately in one column. Further, the haptic detection piezoelectric devices 021 and the haptic driving piezoelectric devices 022 can be connected with the driving control circuit 200 through a connection interface DP.

Of course, the plurality of haptic detection piezoelectric devices and the plurality of haptic driving piezoelectric devices may also be arranged on the base substrate 1 in other arrangements, and this disclosure is not limited to this.

For example, in the haptic detection piezoelectric device, the bottom electrode 21 is grounded, and the bonding electrode 24 is connected to a driving detection terminal. When the finger touches the surface of the base substrate 1, the top electrode 22 generates a charge signal, and the charge signal can be output by the driving detection terminal.

For example, in the haptic driving piezoelectric device, the bottom electrode 21 is grounded, and the bonding electrode 24 is connected to the driving voltage input terminal. The driving control signal input at the driving voltage input terminal is an alternating voltage signal. By loading an alternating voltage signal (VAC) to the top electrode 22 through the driving voltage input terminal, an alternating electric field can be formed between the top electrode 22 and the bottom electrode 21. The frequency of the alternating electric field is the same as the frequency of the alternating voltage signal. Under the effect of alternating electric field, the piezoelectric layer 23 undergoes deformation and produces a vibration signal. The frequency of this vibration signal is the same as the frequency of the alternating electric field. When the frequency of the vibration signal is close to or equal to the natural frequency of the base substrate 1, the base substrate 1 resonates, the amplitude is enhanced, and a haptic feedback signal is generated. When the finger touches the surface of the base substrate 1, the change of friction force can be clearly felt. In practical application, the friction force on the surface of the base substrate 1 can be adjusted by the resonance generated between the piezoelectric layer 23 and the base substrate 1, so that the texture of the object can be reproduced on the surface of the base substrate 1.

In some embodiments of the present disclosure, the bottom electrode 21 and the bonding electrode 24 may be formed with the same material and using the same composition process.

It should be noted that the bottom electrodes 21 of all piezoelectric devices 2 in FIG. 2A can be a patterned structure or a full-sided surface structure. The piezoelectric layer 23 of all piezoelectric devices 2 is a patterned structure, and can also be a full-sided surface structure. The top electrodes 22 of all piezoelectric devices 2 are patterned structures, for example, the top electrodes 22 of all piezoelectric devices 2 are patterned structures corresponding to the piezoelectric layer 23 in one-to-one correspondence.

In a specific implementation, the material of the piezoelectric layer can be lead zirconate titanate ($Pb(Zr, Ti)O_3$, PZT), and can also be at least one of aluminum nitride (AlN), zinc oxide (ZnO), barium titanate ($BaTiO_3$), lead titanate ($PbTiO_3$), potassium niobate ($KNbO_3$), lithium niobate ($LiNbO_3$), lithium tantalate ($LiTaO_3$), or the gallium lanthanum silicate ($La_3Ga_5SiO_{14}$). The material for making the piezoelectric layer can be selected according to the actual use needs of those skilled in the art, and is not limited herein. When using PZT to make a piezoelectric layer, because PZT has a high-voltage electric coefficient, the piezoelectric characteristics of the corresponding haptic feedback panel 100 are ensured, the corresponding haptic feedback panel 100 can be applied to the haptic feedback apparatus. Moreover, the PZT has high light transmittance, and the display quality of the display device is not affected when the PZT is integrated into the display device.

In the specific embodiment, the top electrode and bottom electrode of the piezoelectric device are transparent conductive materials, for example, can be made of indium tin oxide (ITO), can also be made of indium zinc oxide (IZO), can also be made of one of titanium (Ti—Au) alloy, titanium aluminum titanium (Ti—Al—Ti) alloy, titanium molybdenum (Ti—Mo) alloy. In addition, the top electrode and bottom electrode of the piezoelectric device can also be made of one of titanium (Ti), gold (Au), silver (Ag), molybdenum (Mo), copper (Cu), tungsten (W), and Chromium (Cr), and those skilled in the art can set up the above-mentioned transparent conductive electrode according to the needs of practical application, and there is no restriction herein.

In some embodiments of the present disclosure, as shown in FIG. 2A to FIG. 3, the haptic feedback panel 100 further includes a support layer 4 located on the base substrate 1. The support layer 4 and the piezoelectric device 2 are located on the same side of the base substrate 1. Specifically, the support layer 4 is mainly configured to connect the base substrate 1 and an equipment. The equipment can be either a support frame or a support plate. Specifically, the equipment is mainly configured to support the haptic feedback panel 100, and can be the bezel of the display screen, the bezel of the notebook touchpad, etc. Specifically, the equipment and the support layer 4 can be fixedly connected by an adhesive layer (such as optical adhesive, OCA) and the like.

In some embodiments of the present disclosure, the material of the support layer 4 may include, but is not limited to, at least one of the following: rubber, foam, foam rubber, or polydimethylsiloxane (PDMS). Specifically, the supporting layer 4 and the base substrate 1 can be fixedly connected through an adhesive layer (such as optical adhesive, OCA) and the like between. For example, the support layer 4 may include a support portion 411 located around the base substrate 1 and surround all piezoelectric devices 2. Optionally, a shape of the orthographic projection of the support layer 4 (support portion 411) on the base substrate 1 includes a square, a triangle, a circle, a trapezoidal or a polygon. Of course, the present disclosure does not limit the specific position of the support layer 4, and the position of the support layer 4 can be determined according to the needs of practical application, and is not limited herein.

Figure 5:
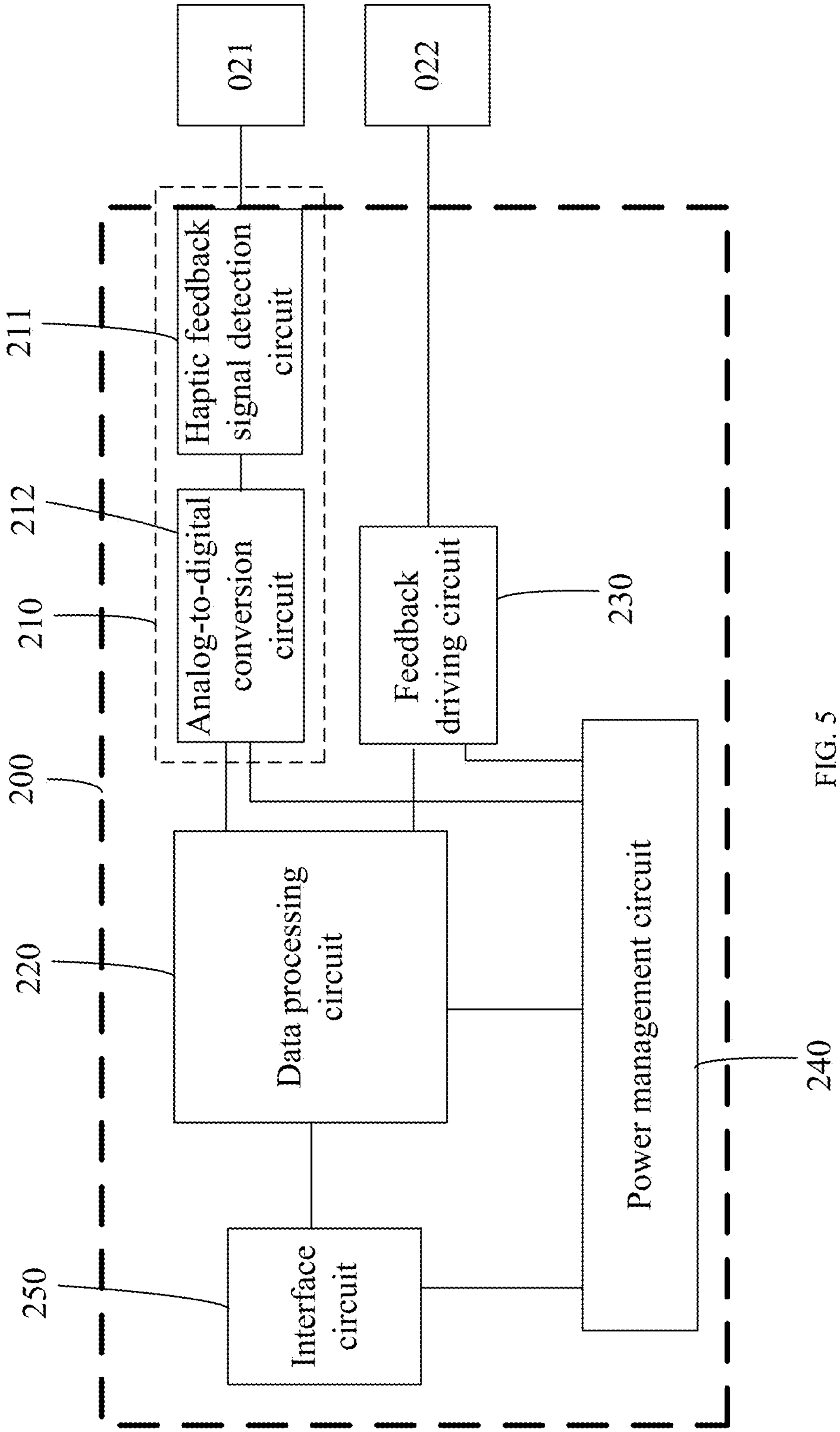
FIG. 5 is a schematic diagram of some structures of a driving control circuit provided by an embodiment of the present disclosure.

In some embodiments of the present disclosure, as shown in FIG. 1 and FIG. 5, the driving control circuit 200 includes:

a feedback detection circuit 210, coupled with at least one haptic detection piezoelectric device in the haptic feedback panel 100. The feedback detection circuit 210 includes: an analog-to-digital conversion circuit 212 and at least one haptic feedback signal detection circuit 211. Each haptic feedback signal detection circuit 211 in the at least one haptic feedback signal detection circuit 211 is coupled with at least one haptic detection piezoelectric device 021, the analog-to-digital conversion circuit 212 is coupled with the at least one haptic feedback signal detection circuit 211, and the haptic feedback signal detection circuit 211 is configured to amplify the charge signal of the coupled haptic detection piezoelectric device 021 at least twice to be a target voltage signal and output the target voltage signal as a haptic feedback signal to the analog-to-digital conversion circuit 212. The analog-to-digital conversion circuit 212 is configured to implement an analog-to-digital conversion to the haptic feedback signal output by each haptic feedback signal detection circuit 211 in at least one haptic feedback signal detection circuit 211 and output the converted haptic feedback signal as a detection signal;

a data processing circuit 220, coupled with the feedback detection circuit 210, and the data processing circuit 220 is configured to receive a detection signal corresponding to each haptic feedback signal detection circuit, and output a drive enabling signal according to the detection signal corresponding to each haptic feedback signal detection circuit and a preset threshold;

a feedback drive circuit 230 respectively coupled with at least one haptic driving piezoelectric device 022 in the haptic feedback panel 100 and the data processing circuit 220, and the feedback drive circuit 230 is configured to receive the drive enabling signal and output a driving control signal to at least one haptic driving piezoelectric device 022 based on the drive enabling signal.

The driving control circuit provided in the embodiments of the present disclosure is provided with the feedback detection circuit, the data processing circuit and the feedback drive circuit, and can output the driving control signal to at least one haptic driving piezoelectric device based on the detection signal obtained from the charge signal of the haptic detection piezoelectric device, through the cooperation of the feedback detection circuit, the data processing circuit and the feedback drive circuit, so as to adjust the friction force on the surface of the base substrate through the resonance generated between the piezoelectric layer and the base substrate, thereby realizing the texture reproduction of the object on the surface of the base substrate.

In some embodiments of the present disclosure, as shown in FIG. 1 and FIG. 5, the driving control circuit 200 further includes: a power management circuit 240 and an interface circuit 250. The power management circuit 240 is configured to provide a power supply voltage to the feedback detection circuit 210, the data processing circuit 220 and the feedback drive circuit 230. The data processing circuit 220 is coupled with the touch drive circuit and the haptic feedback panel 100 through the interface circuit 250.

For example, a power management circuit can be a Power Management Integrated Circuit (PMIC). Of course, in practical applications, the specific structure of the power management circuit is not limited here, and it can also be other circuits that can realize this function.

For example, the interface circuit can include: a Universal Serial Bus (USB) interface, a High Definition Multimedia Interface (HDMI), etc., which are not limited here.

When the user uses the haptic feedback panel, in most cases the finger is used for operation, so that in the embodiments of the present disclosure, the target object may be a finger. Of course, in practical applications, the target object can also be other objects, which is not limited here.

Figure 6:
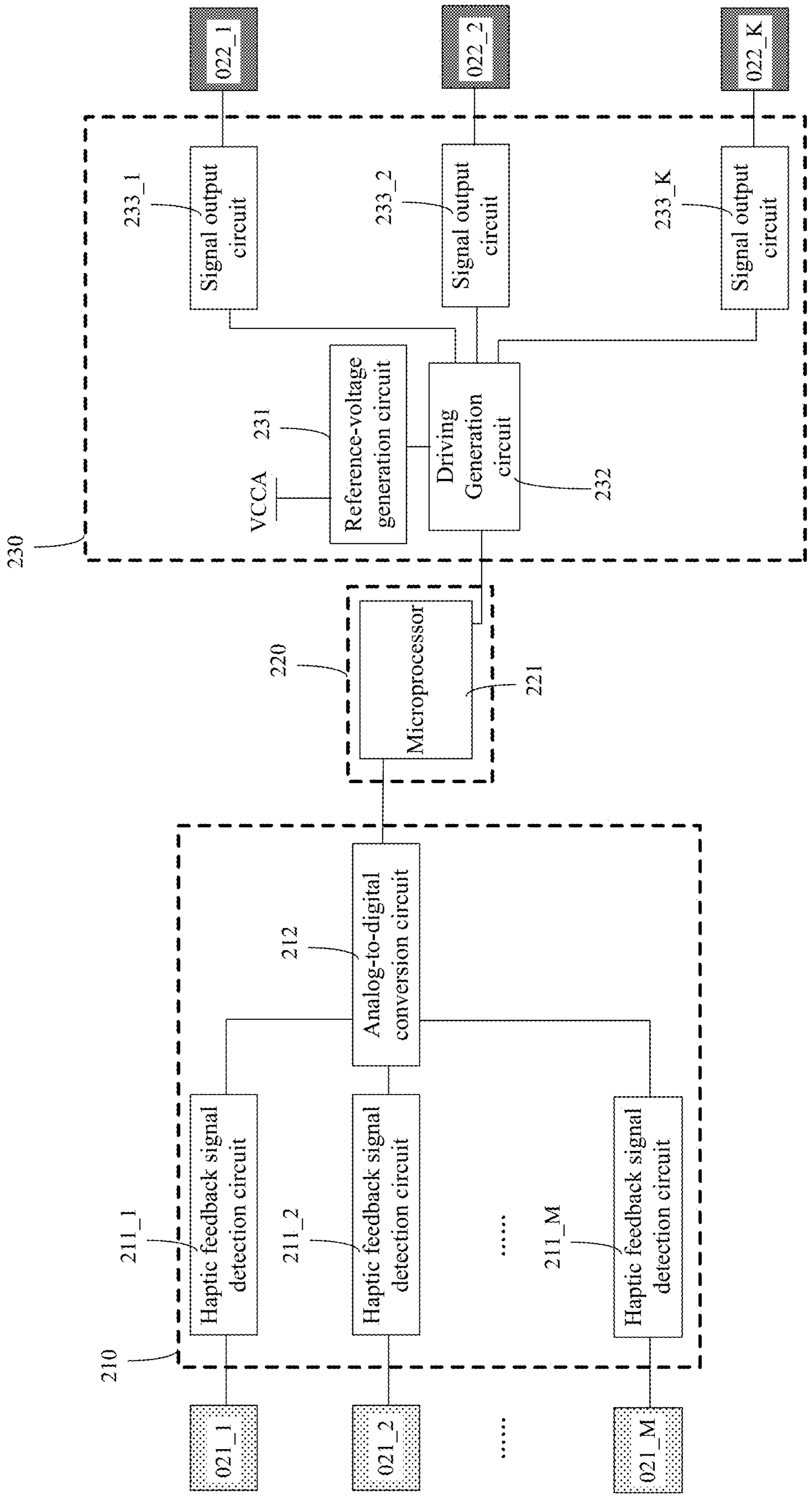
FIG. 6 is another schematic diagram of some structures of the driving control circuit provided by an embodiment of the present disclosure.

In some embodiments of the present disclosure, as shown in FIG. 6, one haptic feedback signal detection circuit can be coupled with one haptic detection piezoelectric device. For example, the haptic feedback panel 100 is provided with M haptic detection piezoelectric devices 021_1~021_M, that is, the total quantity of haptic detection piezoelectric devices is M, then M haptic feedback signal detection circuits 211_1~211_M are arranged, and the haptic feedback signal detection circuits 211_1~211_M are coupled with the haptic detection piezoelectric devices 021_1~021_M in one-to-one correspondence.

Of course, in practical applications, it is also possible to couple one haptic feedback signal detection circuit with two, three or more haptic detection piezoelectric devices, which is not limited here.

In some embodiments of the present disclosure, one analog-to-digital conversion circuit can be coupled with one haptic feedback signal detection circuit. It is also possible to couple one analog-to-digital conversion circuit with two, three, five, or seven haptic feedback signal detection circuits, which are not limited here.

Exemplary, as shown in FIG. 6, the analog-to-digital conversion circuit 212 can be coupled with M haptic feedback signal detection circuits 211_1~211_M. This reduces the quantity of used analog-to-digital conversion circuits 212. For example, the analog-to-digital conversion circuit 212 can be an analog-to-digital converter (ADC). Optionally, the analog-to-digital conversion circuit 212 can convert each target voltage signal into a 16-bits digital signal and input the digital signal into the data processing circuit.

In some embodiments of the present disclosure, the data processing circuit 220 is further configured to determine a detection comparison value according to the detection signal corresponding to each haptic feedback signal detection circuit and the weight corresponding to each haptic detection piezoelectric device. When the detection comparison value is not less than a preset threshold, the drive enabling signal is output to carry out the driving process of texture reproduction. When the detection comparison value is less than the preset threshold, the drive enabling signal is not output, that is, the driving process of texture reproduction is not carried out. For example, when the detection comparison value is not less than the preset threshold, the corresponding drive enabling signal is output according to the coordinates of the position pressed by the finger and the image information displayed at the position pressed by the finger.

In some embodiments of the present disclosure, M haptic detection piezoelectric devices are arranged in the haptic feedback panel 100, and the M haptic detection piezoelectric devices are defined as the 1st haptic detection piezoelectric device 021_1 to the M-th haptic detection piezoelectric device 021_M. The m-th haptic detection piezoelectric device 021_*m* is any one of the 1st haptic detection piezoelectric device 021_1 to the M-th haptic detection piezoelectric device 021_M. That is, 1≤m≤M, and M and m are integers. To clarify, M can be set to 16, 20, 30 or more. In practical application, the specific value of M can be determined according to the needs of practical application, and is not limited here.

In some embodiments of the present disclosure, the following formula is used to determine the detection comparison value:

$$FS = a_1 * f_1 + a_2 * f_2 + a_3 * f_3 + \ldots\ldots\ a_{M-1} * F_{M-1} + a_M * F_M;$$

here, FS represents the detection comparison value, $a_m$ represents the weight corresponding to the M-th haptic detection piezoelectric device, and $f_m$ represents the detection signal corresponding to a haptic feedback signal detection circuit coupled with the m-th haptic detection piezoelectric device.

In some embodiments of the present disclosure, the data processing circuit 220 is further configured to obtain the coordinates of a position pressed by the target object, determine a pressing distance between the coordinates of the position pressed by the target object and each haptic detection piezoelectric device (such as the center of the haptic detection piezoelectric device) of at least one haptic detection piezoelectric device coupled with each haptic feedback signal detection circuit, and determine the weight of each haptic detection piezoelectric device in at least one haptic detection piezoelectric device coupled to each haptic feedback signal detection circuit based on the pressing distance of each haptic detection piezoelectric device of at least one haptic detection piezoelectric device coupled to each haptic feedback signal detection circuit. For example, taking the target object as a finger and setting up a plurality of haptic detection piezoelectric devices as an example, when the finger is pressed on the haptic feedback panel 100, the coordinates of the position pressed by the finger can be determined by the touch electrode. Because some haptic detection piezoelectric devices are close to the position pressed by the finger, and some haptic detection piezoelectric devices are far away from the position pressed by the finger, the accuracy of the detection signal corresponding to the haptic detection piezoelectric device that is close to the position pressed by the finger is higher than that of the detection signal corresponding to the haptic detection piezoelectric device that is far away from the position pressed by the finger. Therefore, in order to improve the accuracy of the detection comparison value, the weight can be correlated with the distance between the haptic detection piezoelectric device and the position pressed by the finger. Specifically, after the data processing circuit 220 obtains the coordinates of the position, the pressing distance between the coordinates of the position and each haptic detection piezoelectric device (such as the center of the haptic detection piezoelectric device) can be determined, so that the weight corresponding to each haptic detection piezoelectric device can be determined according to the pressing distance of each haptic detection piezoelectric device. In this way, the accuracy of the detection comparison value is improved by making the weight in the detection comparison value related to the pressing distance.

In order to realize the touch function, in some embodiments of the present disclosure, the driving control circuit 200 further includes: a touch drive circuit. The touch drive circuit is coupled with a plurality of touch electrodes in the haptic feedback panel 100 respectively, and the touch drive circuit is configured to obtain touch voltage signals on the touch electrodes when pressed by the target object, and the coordinates of the position pressed by the target object are determined according to the obtained plurality of touch voltage signals. In addition, the data processing circuit 220 is further configured to obtain the coordinates of the position pressed by the target object from the touch drive circuit.

For example, the haptic feedback panel 100 further has display pixels to enable the display of the picture. Optionally, the touch drive circuit can be an integrated circuit (IC) that can realize the touch drive function. The driving control circuit 200 may further include a display driver IC that can realize the display drive function. The display driver IC is configured to drive a haptic feedback panel 100 to display pictures. Alternatively, the touch drive circuit can further be a display driver IC that can realize the display drive function and the touch drive function, that is, the touch drive circuit can further be configured to drive the haptic feedback panel 100 to display pictures.

In some embodiments of the present disclosure, the data processing circuit 220 can obtain the coordinates of the position pressed by the target object from the touch drive circuit through the interface circuit. In addition, the data processing circuit 220 can output display information through the interface circuit. For example, a data processing circuit 220 can output display information to the display driver IC through the interface circuit.

For example, as shown in FIG. 6, the data processing circuit 220 can be set up as a microprocessor (microcontroller unit, MCU). Of course, the data processing circuit 220 can also be set up as a processor in other forms, which is not limited here.

In some embodiments of the present disclosure, as shown in FIG. 6, the haptic feedback signal detection circuit 211_*m* is coupled with the corresponding haptic detection piezoelectric device 021_*m*. The analog-to-digital conversion circuit 212 is coupled with the detection output terminals of the haptic feedback signal detection circuits 211_1~211_M. Specifically, the haptic feedback signal detection circuit 211_*m* is coupled with the top electrode 22 in the haptic detection piezoelectric device 021_*m* through the driving detection terminal. In addition, the haptic feedback signal detection circuit 211_*m* is configured to amplify the charge signal of the coupled haptic detection piezoelectric device at least twice when pressed by the target object to generate a target voltage signal, and output the generated target voltage signal as the haptic feedback signal through the detection output terminal. The analog-to-digital conversion circuit 212 is configured to receive the haptic feedback signal output by the coupled haptic feedback signal detection circuit 211_1~211_M, and implement the analog-to-digital conversion to each received haptic feedback signal to generate a detection signal and output the generated detection signal.

In some embodiments of the present disclosure, K haptic driving piezoelectric devices are arranged in the haptic feedback panel 100, that is, the total quantity of haptic driving piezoelectric devices arranged is K. The K haptic driving piezoelectric devices are defined as the 1st haptic driving piezoelectric device 022_1 to the K-th haptic driving piezoelectric device 022_K. The k-th haptic driving piezoelectric device 022_*k* is any one of the 1st haptic driving piezoelectric device 022_1 to the K-th haptic driving piezoelectric device 022_K. That is, 1≤k≤K, and K and k are integers. To clarify, K can be set to 6, 16, 20, 30, or more. In practical application, the specific value of K can be determined according to the needs of practical application, and is not limited here.

In some embodiments of the present disclosure, the feedback drive circuit may include: at least one reference-voltage generation circuit, at least one driving generation circuit and a plurality of signal output circuits. Here, one reference-voltage generation circuit, one driving generation circuit and a plurality of signal output circuits may be set to reduce the quantity of devices and reduce costs. Exemplary, the reference-voltage generation circuit is coupled to the driving generation circuit, and the driving generation circuit is coupled to the signal output circuits.

Exemplary, taking a plurality of haptic driving piezoelectric devices as an example, as shown in FIG. 6, the feedback drive circuit includes: a reference-voltage generation circuit 231, a driving generation circuit 232, and a plurality of signal output circuits 233_1~233_K. The reference-voltage generation circuit 231 is coupled with the driving generation circuit 232, the driving generation circuit 232 is coupled with the plurality of signal output circuits 233_1~233_K. The plurality of signal output circuits 233_*k* are coupled with the plurality of haptic driving piezoelectric devices 022_*k* in one-to-one correspondence.

In some embodiments of the present disclosure, as shown in FIG. 6, the reference-voltage generation circuit 231 is coupled with the reference-power supply terminal VCCA and the driving generation circuit 232 respectively. The driving generation circuit 232 is coupled with the data processing circuit 220, and the signal output circuits 233_*k* are coupled with the driving generation circuit 232. The reference-voltage generation circuit 231 is configured to generate a reference voltage based on the reference-power supply terminal VCCA. The driving generation circuit 232 is configured to receive the drive enabling signal and the reference voltage, generate an initial control signal according to the drive enabling signal and the reference voltage, and output the initial control signal. The signal output circuits 233_*k* are configured to receive the initial control signal, and step up the initial control signal to generate a driving control signal, and output the driving control signal to the haptic driving piezoelectric device 022_*k* coupled correspondingly. For example, the reference-voltage generation circuit 231 is configured to step down the reference-power supply terminal VCCA (e.g., 5V) to generate a reference voltage (e.g., 2.5V).

The driving control circuit 200 provided in the embodiments of the present disclosure is described in detail below in conjunction with the specific embodiment. It should be noted that the following embodiments are only for a better interpretation of the present disclosure, but do not limit the present disclosure.

In some embodiments of the present disclosure, the haptic feedback signal detection circuit may include: a charge-voltage conversion circuit and at least one voltage amplification circuit. The charge-voltage conversion circuit is coupled with at least one haptic detection piezoelectric device in the haptic feedback panel, and the charge-voltage conversion circuit is configured to convert the charge signal of each of the at least one haptic detection piezoelectric device into an initial voltage signal when pressed by the target object and output the initial voltage signal. In addition, at least one voltage amplification circuit is configured to sequentially amplify the initial voltage signal to the target voltage signal and output the target voltage signal to the detection output terminal as the haptic feedback signal.

The amplification circuit applied to the piezoelectric film in the related art is to directly amplify the voltage signal on the piezoelectric film and output the amplified voltage signal, when the amplitude of the signal output by the piezoelectric film is less than 10 mv, since the influence of the cable distribution capacitance and the like in the input path, the effective signal will be annihilated in the noise, and the effective signal cannot be amplified, which is not conducive to the subsequent data processing and calculation.

The haptic feedback signal detection circuit provided in the embodiments of the present disclosure can preferentially process the charge generated by the piezoelectric device by setting up a charge-voltage conversion circuit to convert the charge into a voltage signal. After that, the voltage signal is amplified to enhance the obtained target voltage signal, which is conducive to the subsequent data processing.

Figure 7:
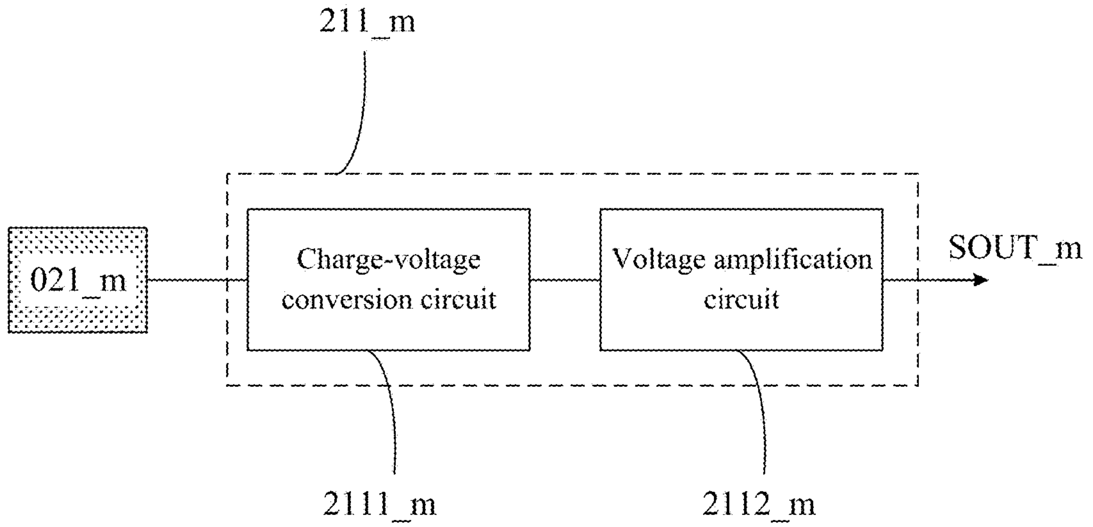
FIG. 7 is a schematic diagram of some structures of the haptic feedback signal detection circuit provided by an embodiment of the present disclosure.

Exemplary, as shown in FIG. 7, the haptic feedback signal detection circuit 211_*m* may include a charge-voltage conversion circuit 2111_*m* and a voltage amplification circuit 2112_*m*. The charge-voltage conversion circuit 2111_*m* is coupled with the haptic detection piezoelectric device 021_*m*, the charge-voltage conversion circuit 2111_*m* is coupled with the voltage amplification circuit 2112_*m*, and the voltage amplification circuit 2112_*m* is coupled with the detection output terminal SOUT_m.

Of course, the haptic feedback signal detection circuit can also include two, three, four, five, six, or more voltage amplification circuits to achieve multistage amplification output, which is not limited here. The following is illustrated with the haptic feedback signal detection circuit including one voltage amplification circuit as an example.

Figure 8A:
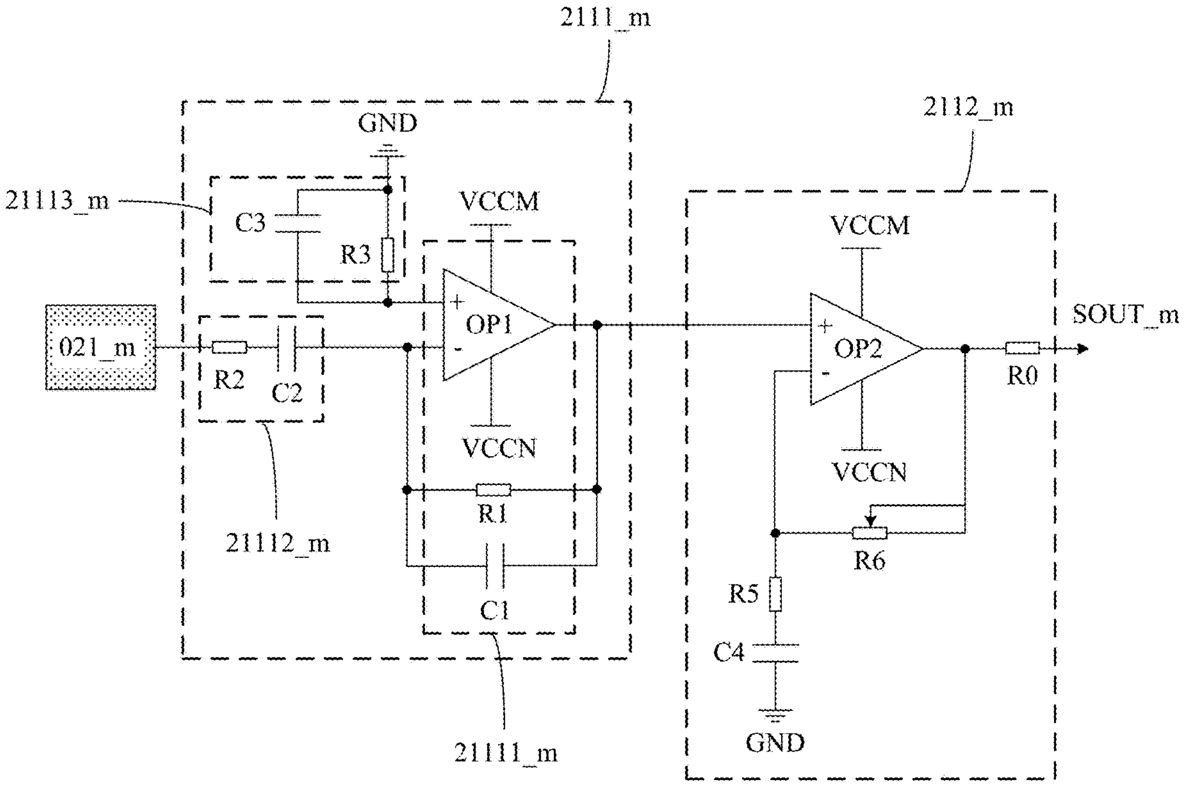
FIG. 8A is a schematic diagram of some specific structures of the haptic feedback signal detection circuit provided by an embodiment of the present disclosure.
Figure 8B:
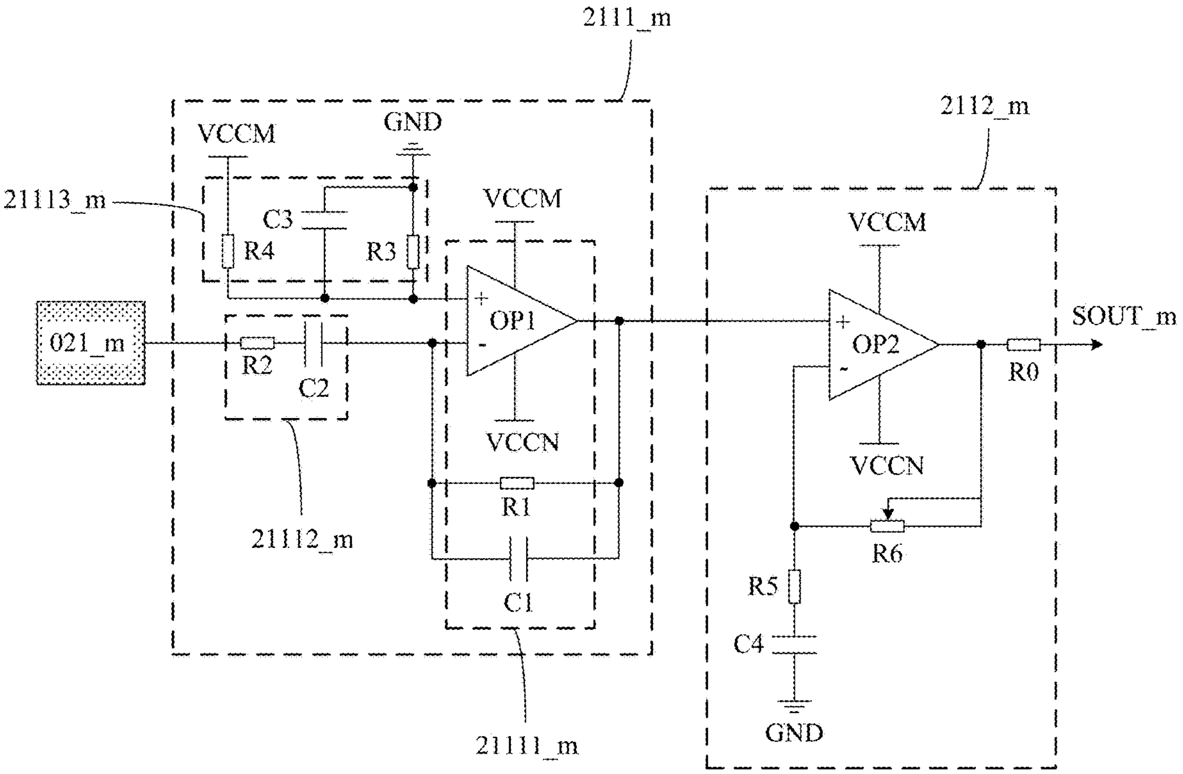
FIG. 8B is another schematic diagram of some specific structures of the haptic feedback signal detection circuit provided by an embodiment of the present disclosure.
Figure 8C:
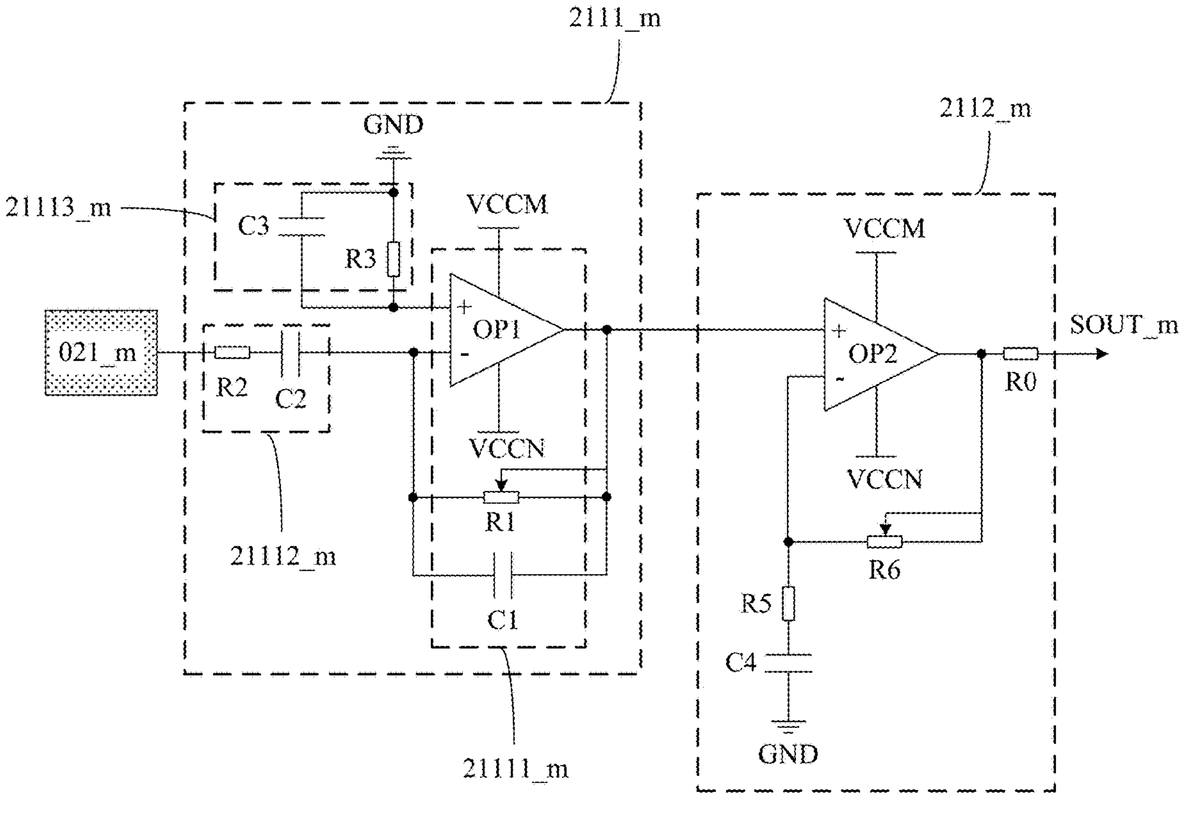
FIG. 8C is another schematic diagram of some specific structures of the haptic feedback signal detection circuit provided by an embodiment of the present disclosure.

In some embodiments of the present disclosure, as shown in FIG. 8A to FIG. 8C, the charge-voltage conversion circuit 2111_m includes: a charge-voltage conversion sub-circuit 21111_m, a phase compensation sub-circuit 21112_m and a matching sub-circuit 21113_m. The charge-voltage conversion sub-circuit 21111_m is configured to convert the charge signal of each haptic detection piezoelectric device in the at least one haptic detection piezoelectric device 021_m into an initial voltage signal and output the initial voltage signal. The phase compensation sub-circuit 21112_m is coupled between the charge-voltage conversion sub-circuit 21111_m and at least one haptic detection piezoelectric device 021_m and is configured for phase compensation. The matching sub-circuit 21113_m is coupled with the charge-voltage conversion sub-circuit 21111_m and is configured for matching balancing.

In some embodiments of the present disclosure, as shown in FIG. 8A to FIG. 8C, the charge-voltage conversion sub-circuit 21111_m includes: a first amplifier OP1 and a first capacitor C1. The first input terminal of the first amplifier OP1 is coupled with the phase compensation sub-circuit 21112_m and the first electrode plate of the first capacitor C1, and the second input terminal of the first amplifier OP1 is coupled with the matching sub-circuit 21113_m, the output terminal of the first amplifier OP1 is coupled the second electrode plate of the first capacitor C1 and the voltage amplification circuit 2112_m.

It should be noted that in FIG. 8A to FIG. 8C, "+" represents the positive phase input terminal and "−" represents the negative phase input terminal.

In the embodiments of the present disclosure, the first amplifier OP1 needs to select an operational amplifier with high input impedance and small bias current. In practical application, the concept of virtual ground input of the first amplifier OP1 is used to directly integrate the charge signal on the haptic detection piezoelectric device to the first capacitor C1, so that the output of the first amplifier OP1 is the output of the sum of all charges. For example, the output of the first amplifier OP1 is the initial voltage signal $U_0$, $U_0=-Q_{021}/c_1$. $Q_{021}$ represents the charge on the haptic detection piezoelectric device, and $c_1$ represents the capacitance value of the first capacitor C1.

Exemplary, the first amplifier OP1 includes, but is not limited to, a JFET-type amplifier. The present disclosure takes the JFET-type amplifier as an example.

In some embodiments of the present disclosure, as shown in FIG. 8A to FIG. 8C, the charge-voltage conversion circuit 2111_m further includes: a first resistor R1. The first terminal of the first resistor R1 is coupled with the first input terminal of the first amplifier OP1, and the second terminal of the first resistor R1 is coupled with the output terminal of the first amplifier OP1.

For example, in a practical application, there may be a leakage current in the first amplifier OP1. The first resistor R1 is set to provide a charge leaking path for the first capacitor C1. Optionally, the resistance value of the first resistor R1 can be 100 MΩ-1 GΩ.

Exemplary, as shown in FIG. 8A and FIG. 8B, the first resistor R1 can be a resistor with a fixed resistance value.

Since the click frequency of the piezoelectric film is different, the lower the frequency of the pressure signal to be measured is, the greater the resistance value of the first resistance R1 is required, so the resistance value of the first resistance R1 can be dynamically adjusted to adapt the lower frequency applications. Exemplary, as shown in FIG. 8C, the first resistor R1 can also be set to a resistor with a variable resistance value. Optionally, the resistance value of the first resistor R1 can be determined after determining the signal frequency range according to the previous test, and it will not be changed in the later stage. Alternatively, the resistance value of the first resistor R1 can also be changed in the application, and when a suitable output is determined, the resistance value is also fixed and does not change again.

In some embodiments of the present disclosure, as shown in FIG. 8A to FIG. 8C, the phase compensation sub-circuit 21112_m includes: a second resistor R2 and a second capacitor C2. The first terminal of the second resistor R2 is coupled with at least one haptic detection piezoelectric device 021_m, the second terminal of the second resistor R2 is coupled with the first electrode plate of the second capacitor C2. The second electrode plate of the second capacitor C2 is coupled with the charge-voltage conversion sub-circuit 21111_m.

In some embodiments of the present disclosure, as shown in FIG. 8A to FIG. 8C, the matching sub-circuit 21113_m includes: a third resistor R3 and a third capacitor C3. The first terminal of the third resistor R3 is coupled with the charge-voltage conversion sub-circuit 21111_m, and the second terminal of the third resistor R3 is coupled with the ground terminal GND. The first electrode plate of the third capacitor C3 is coupled with the charge-voltage converter sub-circuit 21111_m, and the second terminal plate of the third capacitor C3 is coupled with the ground terminal GND.

In some embodiments of the present disclosure, as shown in FIG. 8A to FIG. 8C, the matching sub-circuit 21113_m further includes a fourth resistor R4. The first terminal of the fourth resistor R4 is coupled with the reference-voltage terminal VCCM, and the second terminal of the fourth resistor R4 is coupled with the second input terminal of the first amplifier OP1. In this way, the DC bias of the output signal can be changed by the ratio of the resistance values of the second resistor R2 and the fourth resistor R4, and the charge signal of the piezoelectric film can be raised above the level of the required DC bias to meet the needs of the analog-to-digital conversion circuit.

Optionally, the specific DC bias can be confirmed according to the requirements, so that the resistance values of the third resistor R3 and the fourth resistor R4 can be calculated to fix the resistance values of the third resistor R3 and the fourth resistor R4. Alternatively, variable resistors can be used as the third resistor R3 and the fourth resistor R4 for adding flexibility in later commissioning. In this embodiment, the third resistance R3 and the fourth resistance R4 with fixed resistance values are taken as examples.

For example, the capacitance of the second capacitor C2 can be the same as that of the third capacitor C3, such as 0.1 uF.

In some embodiments of the present disclosure, as shown in FIG. 8A to FIG. 8C, the voltage amplification circuit 2112_m includes: a second amplifier OP2, a fifth resistor R5, a sixth resistor R6 and a fourth capacitor C4. The first input terminal of the second amplifier OP2 is coupled with the charge-voltage converter circuit 2111_m, the second input terminal of the second amplifier OP2 is coupled with the first terminal of the fifth resistor R5 and the first terminal of the sixth resistor R6, the output terminal of the second amplifier OP2 is coupled with the second terminal of the sixth resistor R6 and the detection output terminal SOUT_m, the second terminal of the fifth resistor R5 is coupled with the first electrode plate of the fourth capacitor C4, and the second electrode plate of the fourth capacitor C4 is coupled with the ground terminal GND.

For example, the capacitance value of the fourth capacitor C4 can be the same as that of the second capacitor C2, such as 0.1 uF.

In some embodiments of the present disclosure, as shown in FIG. 8A to FIG. 8C, the voltage amplification circuit 2112_*m* further includes a protection resistor R0. The output terminal of the second amplifier OP2 is coupled with the detection output terminal through the protection resistor R0.

For example, the sixth resistor R6 can be a resistor of variable resistance values. Optionally, the resistance value of the sixth resistor R6 can be determined after the signal frequency range is determined according to the previous test, and it will not be changed in the later stage. Alternatively, the resistance value of the sixth resistor R6 can also be changed in the application, and when a suitable output is determined, the resistance value is fixed and does not change again.

Combining FIG. 8A to FIG. 8B, the first amplifier OP1 can output the initial voltage signal $U_0$:$U_0=-Q_{021}/c_2$ through the combination of the first amplifier OP1, the capacitor and the resistor in the charge-voltage conversion circuit 2111_*m*. The second amplifier OP2 can output the amplified target voltage signal $U_m$ through the combination of the second amplifier OP2, the capacitor and resistor in the voltage amplification circuit 2112_*m*.

Combining with the FIG. 6, the haptic feedback signal detection circuits 211_1~211_M output the target voltage signals $U_m$_1~$U_m$_M respectively. The target voltage signals $U_m$_1~ $U_m$_M are input into the analog-to-digital conversion circuit. Optionally, the analog-to-digital conversion circuit 212 can convert each target voltage signal into a 16-bits digital signal and input the digital signal into a data processing circuit.

In some embodiments of the present disclosure, a reference-voltage generation circuit may include a reference voltage chip.

Figure 9:
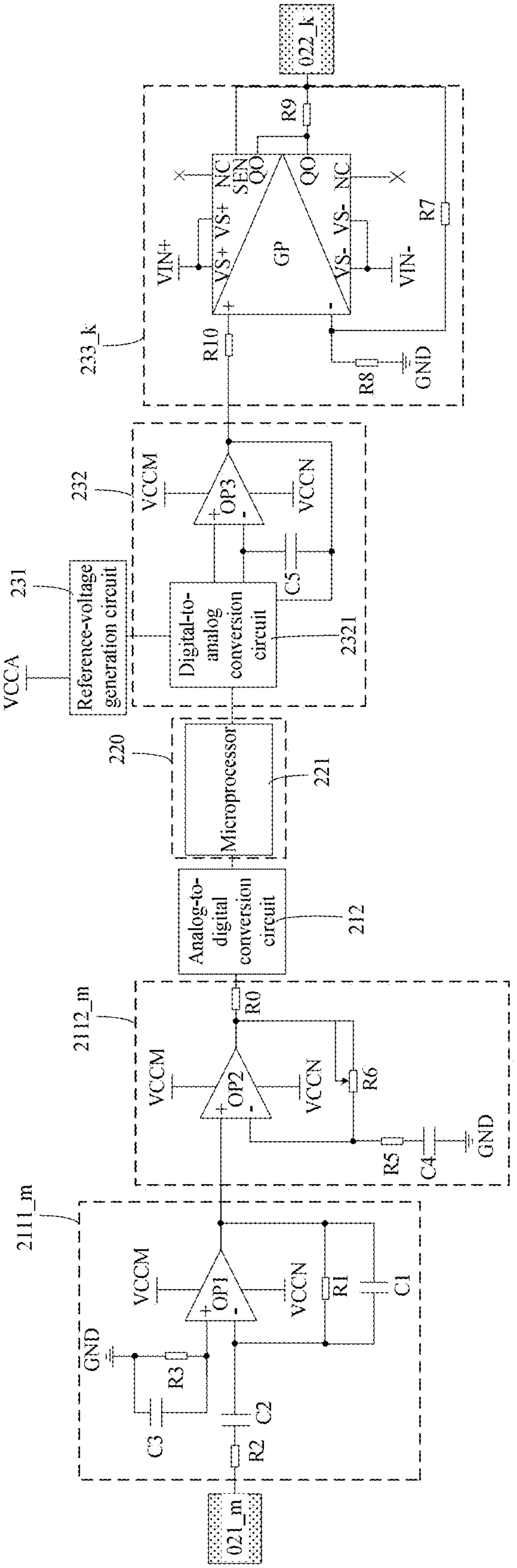
FIG. 9 is schematic diagram of some structures of a driving control circuit provided by an embodiment of the present disclosure.

In some embodiments of the present disclosure, as shown in FIG. 9, the driving generation circuit 232 includes: a digital-to-analog conversion circuit 2321, a third amplifier OP3 and a fifth capacitor C5. The signal input terminal of the digital-to-analog conversion circuit 2321 is coupled with the data processing circuit 220, the reference-voltage input terminal of the digital-to-analog conversion circuit 2321 is coupled with the reference-voltage generation circuit 231, the output terminal of the digital-to-analog conversion circuit 2321 is coupled with the positive phase input terminal of the third amplifier OP3, the comparison-voltage terminal of the digital-to-analog conversion circuit 2321 is coupled with the negative phase input terminal of the third amplifier OP3, and the reference-signal terminal of the digital-to-analog conversion circuit 2321 is coupled with the output terminal of the third amplifier OP3. The output terminal of the third amplifier OP3 is coupled to the signal output circuit 233_*k*. The first terminal of the fifth capacitor C5 is coupled with the negative phase input terminal of the third amplifier OP3, and the second terminal of the fifth capacitor C5 is coupled with the output terminal of the third amplifier OP3.

For example, the digital-to-analog conversion circuit 2321 is a digital to analog converter (DAC).

In some embodiments of the present disclosure, as shown in FIG. 9, the signal output circuit 233_*k* includes a high-voltage operational amplifier GP. The first input terminal of the high-voltage operational amplifier GP is coupled with the driving generation circuit 232, the second input terminal of the high-voltage operational amplifier GP is coupled with the ground terminal GND, and the output terminal of the high-voltage operational amplifier GP is coupled with the corresponding haptic driving piezoelectric device 022_*k*. Specifically, the first input terminal of the high-voltage operational amplifier GP is coupled with the output terminal of the third amplifier in the driving generation circuit 232, and the output terminal of the high-voltage operational amplifier GP is coupled with the top electrode of the corresponding haptic driving piezoelectric device 022_*k*. Optionally, the first input terminal of the high-voltage operational amplifier GP is a positive phase input terminal, and the second input terminal of the high-voltage operational amplifier GP is a negative phase input terminal.

In some embodiments of the present disclosure, as shown in FIG. 9, the signal output circuit 233_*k* further includes a seventh resistor R7. The first terminal of the seventh resistor R7 is coupled with the negative phase input terminal of the high-voltage operational amplifier GP, and the second terminal of the seventh resistor R7 is coupled with the output terminal of the high-voltage operational amplifier GP.

In some embodiments of the present disclosure, as shown in FIG. 9, the signal output circuit 233_*k* further includes an eighth resistor R8. The second input terminal of the high-voltage operational amplifier GP is coupled to the ground terminal GND through the eighth resistor R8. Specifically, the first terminal of the eighth resistor R8 is coupled to the ground terminal GND, and the second terminal of the eighth resistor R8 is coupled to the second input terminal of the high-voltage operational amplifier GP.

In some embodiments of the present disclosure, as shown in FIG. 9, the signal output circuit 233_*k* further includes a ninth resistor R9. The output of the high-voltage operational amplifier GP is coupled to the haptic driving piezoelectric device 022_*k* through the ninth resistor R9. Specifically, the first terminal of the ninth resistor R9 is coupled to the output terminal of the high-voltage operational amplifier GP, and the second terminal of the ninth resistor R9 is coupled to the top electrode of the corresponding haptic driving piezoelectric device 022_*k*.

In some embodiments of the present disclosure, as shown in FIG. 9, the signal output circuit 233_*k* further includes a tenth resistor R10. The first input terminal of the high-voltage operational amplifier GP is coupled with the driving generation circuit 232 through the tenth resistor R10. Specifically, the first terminal of the tenth resistor R10 is coupled with the output terminal of the third amplifier in the driving generation circuit 232, and the second terminal of the tenth resistor R10 is coupled with the first input terminal of the high-voltage operational amplifier GP.

For example, the high-voltage operational amplifier GP further has two VS+ terminals, two VS-terminals, two NC terminals, two output terminals QO, and a SEN terminal. The two VS+ terminals are coupled with the VIN+ voltage terminal. The two VS-terminals are coupled with the VIN-voltage terminal. The two NC terminals are floated and not connected with other components. The two output terminals QO are coupled with each other and coupled with the first terminal of the ninth resistor R9. The SEN terminal is coupled with the second terminal of the ninth resistor R9.

For example, the resistance values of each of the above-mentioned resistors are not limited in this disclosure, and can be determined according to the needs of practical applications.

Exemplary, the first amplifier OP1, the second amplifier OP2, and the third amplifier OP3 are also coupled with the first reference-voltage terminal VCCM and the second voltage-reference terminal VCCN. The voltage at the first reference-voltage terminal VCCM can be a voltage of high level, e.g. a positive voltage. The second reference-voltage terminal VCCN can be a voltage of low level, e.g. a negative or ground voltage.

Figure 10:
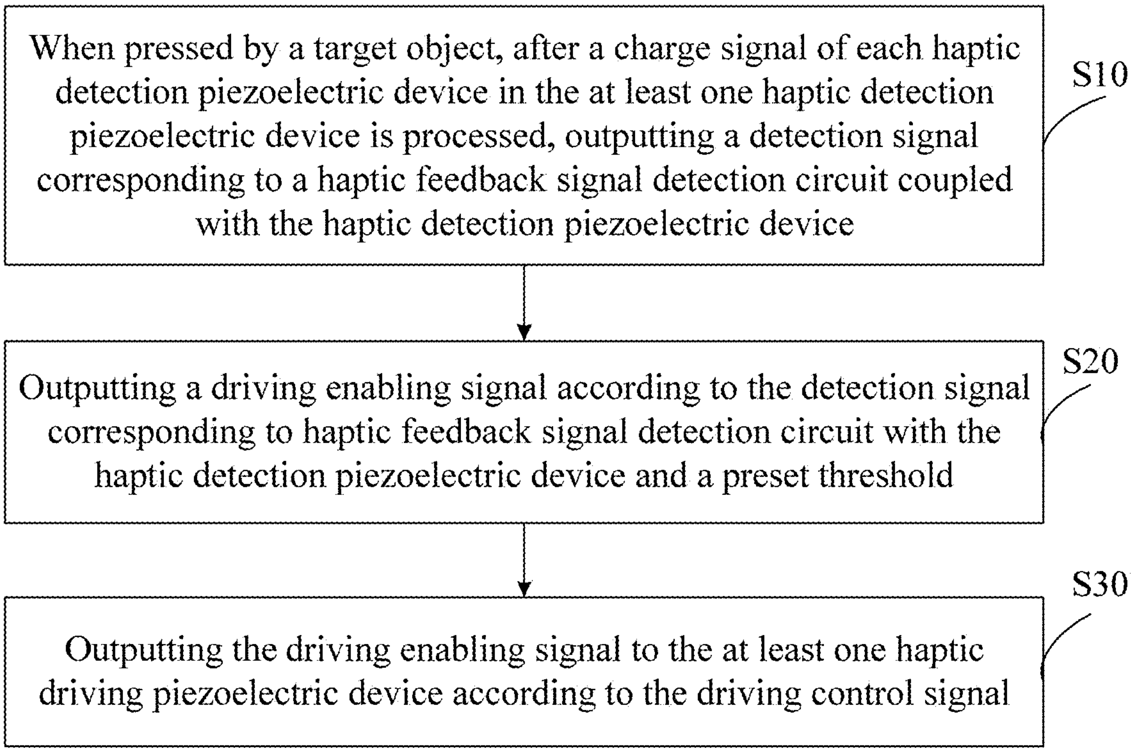
FIG. 10 is a flow chart of a driving method provided by an embodiment of the present disclosure.

The embodiment of the disclosure further provides a driving method for a driving control circuit, as shown in FIG. 10, including:

S10. when pressed by a target object, after a charge signal of each haptic detection piezoelectric device in the at least one haptic detection piezoelectric device is processed, outputting a detection signal corresponding to a haptic feedback signal detection circuit coupled with the haptic detection piezoelectric device;

S20. outputting a driving enabling signal according to the detection signal corresponding to haptic feedback signal detection circuit with the haptic detection piezoelectric device and a preset threshold;

S30. outputting the driving enabling signal to the at least one haptic driving piezoelectric device according to the driving control signal.

Taking the structure of the driving control circuit 200 shown in FIG. 9 as an example, the working process of the driving control circuit 200 provided in the embodiments of the present disclosure is illustrated.

The finger is pressed on the haptic feedback panel 100, and the top electrode 22 of the haptic detection piezoelectric device 021_*m* generates a charge signal, and this charge signal can be output to the first amplifier OP1 by a driving detection terminal, and combined with the capacitor and resistor coupled with the first amplifier OP1, the first amplifier OP1 outputs an initial voltage signal, and the initial voltage signal is input into the second amplifier OP2. After the second amplifier OP2 amplifies the initial voltage signal, a target voltage signal is generated, and the generated target voltage signal is output to an analog-to-digital conversion circuit 212. Because the amplified voltage signal is an analog voltage signal, after the amplified voltage signal is input into the analog-to-digital conversion circuit 212, the amplified voltage signal can be converted into a digital voltage signal through analog-to-digital conversion processing, so that the generated detection signal is the digital voltage signal after the conversion. The detection signal in the form of the digital voltage signal is output to the microprocessor 221.

Moreover, when finger is pressed on the haptic feedback panel 100, the touch drive circuit can obtain the touch voltage signals on the touch electrodes, and determine the coordinates of the position pressed by the target object according to obtained touch voltage signals. The microprocessor 221 obtains the coordinates of the position pressed by the finger from the touch drive circuit, determines the pressing distance between the coordinates of the position pressed by the finger and each haptic detection piezoelectric device, and then determines the weight corresponding to each haptic detection piezoelectric device according to the pressing distance of each haptic detection piezoelectric device. The microprocessor adopts the formula:

$$FS = a_1 * f_1 + a_2 * f_2 + a_3 * f_3 + \ldots\ldots\ a_{M-1} * F_{M-1} + a_M * F_M,$$

to determine the detection comparison value. When the detection comparison value is not less than the preset threshold, the corresponding driving enabling signal is output according to the coordinates of the position pressed by the finger and the image information displayed at the position pressed by the finger, so as to carry out a corresponding driving process of texture reproduction at the position pressed by the finger. When the detection comparison value is less than the preset threshold, the driving enabling signal is not output, that is, the driving process of texture reproduction is not carried out.

The digital-to-analog conversion circuit 2321 receives a driving enabling signal in the form of a digital voltage signal output by the microprocessor 221 and a reference voltage generated by the reference-voltage generation circuit, and generates a transition control signal in the form of an analog voltage signal. This transition control signal is input into the third amplifier OP3, and after amplification processing by the third amplifier OP3, an initial control signal is generated, and the initial control signal is output to the high-voltage operational amplifier GP. The high-voltage operational amplifier GP steps up the initial control signal, generates a driving control signal, and outputs the driving control signal to the top electrode of the haptic driving piezoelectric device 022_*k* coupled correspondingly. The friction on the surface of the base substrate is adjusted by the resonance generated between the piezoelectric layer and the base substrate, so that the texture of the object can be reproduced on the surface of the base substrate.

Figure 11:
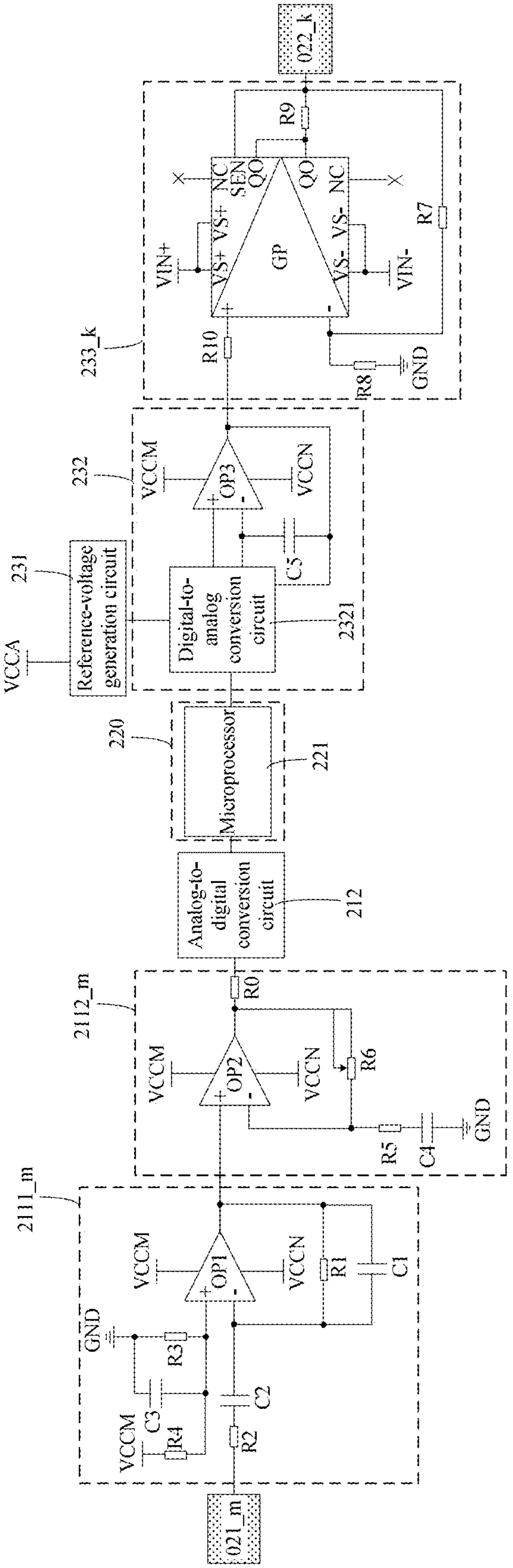
FIG. 11 is another schematic diagram of some structures of the driving control circuit provided by an embodiment of the present disclosure.

The embodiments of the present disclosure provides another schematic diagram of some structures of the driving control circuit, as shown in FIG. 11, and it is deformed for the embodiment in the above embodiments. The following only explains the differences between the present embodiment and the above embodiments, and its similarities are not repeated herein.

In the embodiments of the present disclosure, as shown in FIG. 11, the charge-voltage conversion circuit 2111_*m* adopts the structure shown in FIG. 8B.

It should be noted that the working process of the driving control circuit shown in FIG. 11 can refer to the description of the working process of the above-mentioned driving control circuit, and will not be repeated here.

Figure 12:
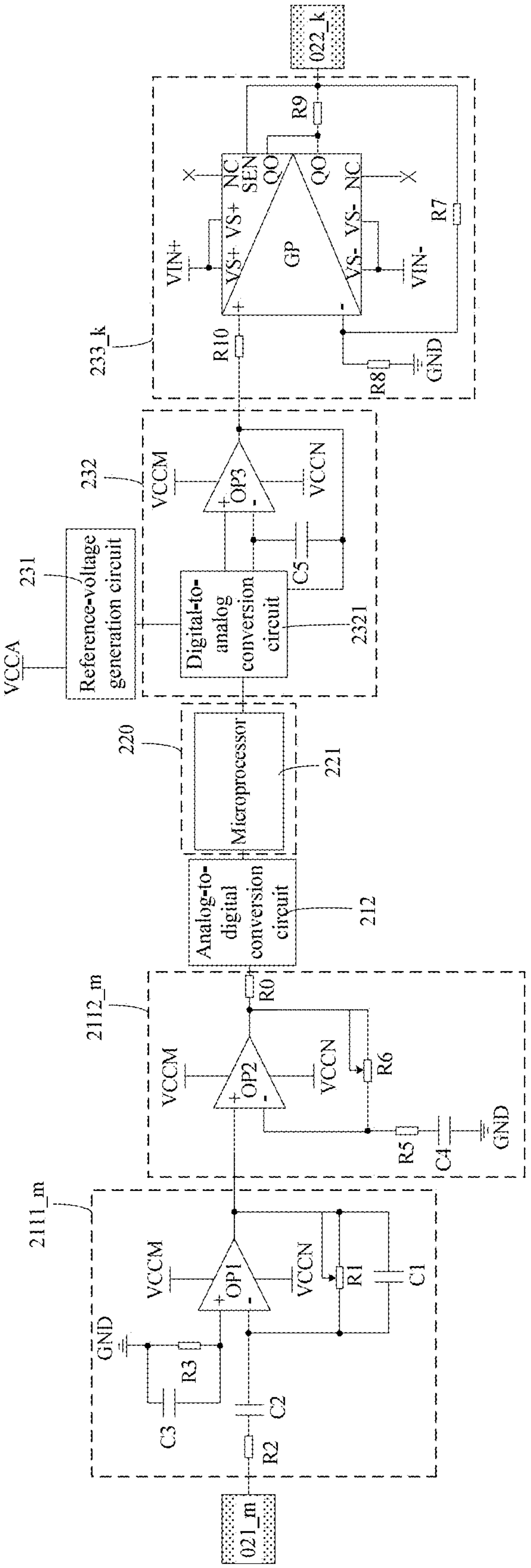
FIG. 12 is another schematic diagram of some structures of the driving control circuit provided by an embodiment of the present disclosure.

The embodiments of the present disclosure provides another schematic diagram of some structures of the driving control circuit, as shown in FIG. 12, which is deformed for the embodiment in the above embodiments. The following only explains the differences between the present embodiment and the above embodiments, and the similarities are not repeated herein.

In the embodiments of the present disclosure, as shown in FIG. 12, the charge-voltage conversion circuit 2111_*m* adopts the structure shown in FIG. 8C.

It should be noted that the working process of the driving control circuit shown in FIG. 12 can refer to the description of the working process of the above-mentioned driving control circuit, and will not be repeated here.

Figure 13:
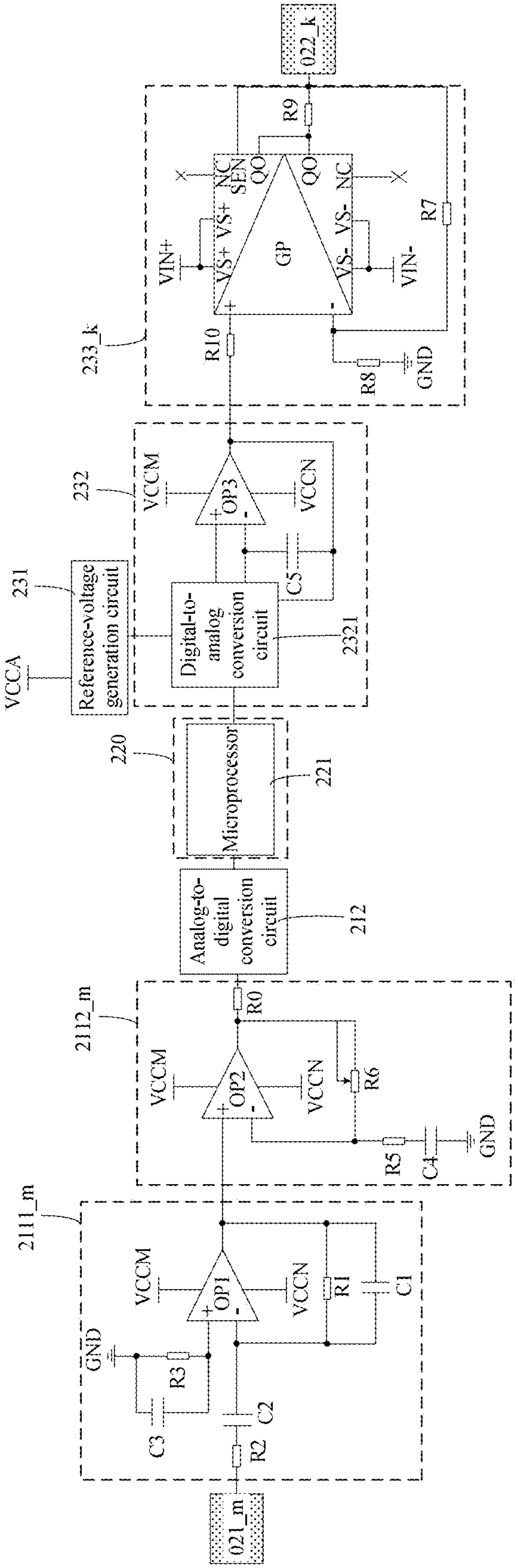
FIG. 13 is another schematic diagram of some other structures of the driving control circuit provided by an embodiment of the present disclosure.

The embodiments of the present disclosure provides another schematic diagram of some structures of the driving control circuit, as shown in FIG. 13, which is deformed for the embodiment in the above embodiments. The following only explains the differences between the present embodiment and the above embodiments, and the similarities are not repeated herein.

In the embodiments of the present disclosure, as shown in FIG. 13, the first input terminal of the high-voltage operational amplifier GP in the driving control circuit 200 is a negative phase input terminal, and the second input terminal of the high-voltage operational amplifier GP in the driving control circuit 200 is a positive phase input terminal.

It should be noted that the working process of the driving control circuit shown in FIG. 13 can refer to the description of the working process of the above-mentioned driving control circuit, and will not be repeated here.

Although the preferred embodiments of the present disclosure have been described, those skilled in the art can make additional changes and modifications to these embodiments once they know the basic creative concept. Therefore, the appended claims are intended to be construed to include the preferred embodiments and all changes and modifications that fall within the scope of the present disclosure.

Obviously, those skilled in the art may make various modifications and variants to the embodiments of the present disclosure without departing from the spirit and scope of the embodiments of the present disclosure. Thus, if these modifications and variants to the embodiments of the present disclosure fall within the scope of the claims of the present disclosure and their equivalents technologies, the present disclosure is also intended to include the modifications and variants.

What is claimed is:

1. A haptic feedback signal detection circuit, comprising:

a charge-voltage conversion circuit, coupled with at least one haptic detection piezoelectric device in a haptic feedback panel: wherein the charge-voltage conversion circuit is configured to convert a charge signal of each haptic detection piezoelectric device in the at least one haptic detection piezoelectric device to an initial voltage signal when pressed by a target object, and output the initial voltage signal;

at least one voltage amplification circuit, wherein the at least one voltage amplification circuit is configured to sequentially amplify the initial voltage signal to a target voltage signal and output the target voltage signal to a detection output terminal as a haptic feedback signal;

wherein the haptic feedback signal detection circuit comprises a voltage amplification circuit;

the voltage amplification circuit comprises: a second amplifier, a fifth resistor, a sixth resistor and a fourth capacitor;

a first input terminal of the second amplifier is coupled with the charge-voltage conversion circuit, a second input terminal of the second amplifier is coupled with a first terminal of the fifth resistor and a first terminal of the sixth resistor, and an output terminal of the second amplifier is coupled with a second terminal of the sixth resistor and the detection output terminal;

a second terminal of the fifth resistor is coupled with a first terminal plate of the fourth capacitor; and a second terminal plate of the fourth capacitor is coupled with a ground terminal.

2. The haptic feedback signal detection circuit according to claim 1, wherein the charge-voltage conversion circuit comprises: a charge-voltage conversion sub-circuit, a phase compensation sub-circuit and a matching sub-circuit;

the charge-voltage conversion sub-circuit is configured to convert the charge signal of each haptic detection piezoelectric device in the at least one haptic detection piezoelectric device to the initial voltage signal, and output the initial voltage signal;

the phase compensation sub-circuit is coupled between the charge-voltage conversion sub-circuit and at least one haptic detection piezoelectric device, and is configured to carry out a phase compensation; and the matching sub-circuit is coupled with the charge-voltage conversion sub-circuit and is configured to carry out a matching balancing.

3. The haptic feedback signal detection circuit according to claim 2, wherein the charge-voltage conversion sub-circuit comprises: a first amplifier and a first capacitor;

a first input terminal of the first amplifier is coupled with the phase compensation sub-circuit and a first terminal plate of the first capacitor, a second input terminal of the first amplifier is coupled with the matching sub-circuit, and an output terminal of the first amplifier is coupled with a second terminal plate of the first capacitor and the at least one voltage amplification circuit.

4. The haptic feedback signal detection circuit according to claim 3, wherein the charge-voltage conversion sub-circuit further comprises: a first resistor:

a first terminal of the first resistor is coupled with the first input terminal of the first amplifier, and a second terminal of the first resistor is coupled with the output terminal of the first amplifier;

wherein the first resistor is a resistor of a fixed resistance value, or the first resistor is a resistor of a variable resistance value.

5. The haptic feedback signal detection circuit according to claim 3, wherein the first amplifier comprises a JFET-type amplifier.

6. The haptic feedback signal detection circuit according to claim 2, wherein the phase compensation sub-circuit comprises: a second resistor and a second capacitor:

a first terminal of the second resistor is coupled with the at least one haptic detection piezoelectric device, a second terminal of the second resistor is coupled with a first terminal plate of the second capacitor, and a second terminal plate of the second capacitor is coupled with the charge-voltage conversion sub-circuit.

7. The haptic feedback signal detection circuit according to claim 3, wherein the matching sub-circuit comprises: a third resistor and a third capacitor:

a first terminal of the third resistor is coupled with the charge-voltage conversion sub-circuit, and a second terminal of the third resistor is coupled with the ground terminal;

a first terminal plate of the third capacitor is coupled with the charge-voltage conversion sub-circuit, and a second terminal plate of the third capacitor is coupled with the ground terminal.

8. The haptic feedback signal detection circuit according to claim 7, wherein the matching sub-circuit further comprises: a fourth resistor:

a first terminal of the fourth resistor is coupled with a reference-voltage terminal, and a second terminal of the fourth resistor is coupled with the second input terminal of the first amplifier.

9. The haptic feedback signal detection circuit according to claim 1, wherein the voltage amplification circuit further comprises a protection resistor: an output terminal of the second amplifier is coupled with the detection output terminal through the protection resistor.

10. A driving control circuit comprising:

a feedback detection circuit comprising: an analog-to-digital conversion circuit and at least one haptic feedback signal detection circuit according to claim 1; wherein the analog-to-digital conversion circuit is coupled with the at least one haptic feedback signal detection circuit, and the analog-to-digital conversion circuit is configured to carry out an analog-to-digital conversion to convert a haptic feedback signal output by each haptic feedback signal detection circuit in the at least one haptic feedback signal detection circuit to a detection signal and output the detection signal;

a data processing circuit coupled with the feedback detection circuit, wherein the data processing circuit is configured to receive the detection signal corresponding to each haptic feedback signal detection circuit, and output a driving enabling signal according to the detection signal corresponding to each haptic feedback signal detection circuit and a preset threshold; and a feedback drive circuit respectively coupled with at least one haptic driving piezoelectric device in the haptic feedback panel and the data processing circuit, wherein the feedback drive circuit is configured to receive the driving enabling signal and output a driving control signal to at least one haptic driving piezoelectric device according to the driving enabling signal.

11. The driving control circuit according to claim 10, wherein the feedback drive circuit comprises: at least one reference-voltage generation circuit, at least one driving generation circuit and at least one signal output circuit: the at least one reference-voltage generation circuit, the at least one driving generation circuit, the at least one signal output circuit and the at least one haptic driving piezoelectric device are in one-to-one correspondence;

the at least one reference-voltage generation circuit is configured to generate a reference voltage;

the at least one driving generation circuit is coupled with the data processing circuit, and the at least one driving generation circuit is configured to receive the driving enabling signal and the reference voltage, generate an initial control signal according to the driving enabling signal and the reference voltage, and output the initial control signal;

the at least one signal output circuit is coupled with the at least one driving generation circuit, and the at least one signal output circuit is configured to receive the initial control signal, step up the initial control signal to generate the driving control signal, and output the driving control signal to the at least one haptic driving piezoelectric device that is correspondingly coupled.

12. The driving control circuit of claim 11, wherein the driving generation circuit comprises: a digital-to-analog conversion circuit, a third amplifier and a fifth capacitor;

a signal input terminal of the digital-to-analog conversion circuit is coupled with the data processing circuit, a reference-voltage input terminal of the digital-to-analog conversion circuit is coupled with the reference-voltage generation circuit, an output terminal of the digital-to-analog conversion circuit is coupled with a positive phase input terminal of the third amplifier, a comparison voltage terminal of the digital-to-analog conversion circuit is coupled with a negative phase input terminal of the third amplifier, and a reference signal terminal of the digital-to-analog conversion circuit is coupled with an output terminal of the third amplifier;

the output terminal of the third amplifier is coupled with the at least one signal output circuit; and a first terminal of the fifth capacitor is coupled with the negative phase input terminal of the third amplifier, and a second terminal of the fifth capacitor is coupled with the output terminal of the third amplifier.

13. The driving control circuit according to claim 11, wherein the signal output circuit comprises a high-voltage operational amplifier;

a first input terminal of the high-voltage operational amplifier is coupled with the driving generation circuit, a second input terminal of the high-voltage operational amplifier is coupled with the ground terminal, and an output terminal of the high-voltage operational amplifier is coupled with a corresponding haptic driving piezoelectric device;

wherein the first input terminal of the high-voltage operational amplifier is a positive phase input terminal, and the second input terminal of the high-voltage operational amplifier is a negative phase input terminal; or, the first input terminal of the high-voltage operational amplifier is a negative phase input terminal, and the second input terminal of the high-voltage operational amplifier is a positive phase input terminal.

14. The driving control circuit of claim 13, wherein the signal output circuit further comprises: a seventh resistor;

a first terminal of the seventh resistor is coupled with the negative phase input terminal of the high-voltage operational amplifier, and a second terminal of the seventh resistor is coupled with the output terminal of the high-voltage operational amplifier.

15. The driving control circuit according to claim 13, wherein the signal output circuit further comprises: at least one of an eighth resistor, a ninth resistor or a tenth resistor;

a first terminal of the eighth resistor is coupled with the ground terminal, and a second terminal of the eighth resistor is coupled with the second input terminal of the high-voltage operational amplifier;

a first terminal of the ninth resistor is coupled with the output terminal of the high-voltage operational amplifier, and a second terminal of the ninth resistor is coupled with the corresponding haptic driving piezoelectric device; and a first terminal of the tenth resistor is coupled with the driving generation circuit, and a second terminal of the tenth resistor is coupled with the first input terminal of the high-voltage operational amplifier.

16. The driving control circuit according to claim 10, wherein the data processing circuit is further configured to determine a detection comparison value according to the detection signal corresponding to each haptic feedback signal detection circuit and a weight corresponding to each haptic detection piezoelectric device, and output the driving enabling signal in response to the detection comparison value not being less than the preset threshold.

17. The driving control circuit according to claim 16, wherein the data processing circuit is further configured to obtain coordinates of a position pressed by a target object, determine a pressing distance between the coordinates of the position pressed by the target object and each haptic detection piezoelectric device in the at least one haptic detection piezoelectric device coupled with each haptic feedback signal detection circuit, and determine the weight corresponding to each haptic detection piezoelectric device in the at least one haptic detection piezoelectric device coupled with each haptic feedback signal detection circuit according to the pressing distance between the coordinates of the position pressed by the target object and each haptic detection piezoelectric device in the at least one haptic detection piezoelectric device coupled with each haptic feedback signal detection circuit.

18. The driving control circuit according to claim 17, further comprising a touch drive circuit; wherein the touch drive circuit is coupled with a plurality of touch electrodes in the haptic feedback panel, and the touch drive circuit is configured to obtain touch voltage signals on the touch electrodes when pressed by the target object, and determine the coordinates of the position pressed by the target object according to obtained touch voltage signals; and the data processing circuit is further configured to obtain the coordinates of the position pressed by the target object from the touch drive circuit.

19. A haptic feedback apparatus comprising: a haptic feedback panel and the driving control circuit according to claim 10.

* * * * *